United States Patent
Elshafie et al.

(10) Patent No.: US 12,375,962 B2
(45) Date of Patent: Jul. 29, 2025

(54) METHODS FOR INTERFERENCE MEASUREMENTS AND REPORTING IN SIDELINK

(71) Applicant: QUALCOMM Incorporated, San Diego, CA (US)

(72) Inventors: Ahmed Elshafie, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 17/744,518

(22) Filed: May 13, 2022

(65) Prior Publication Data
US 2023/0371024 A1    Nov. 16, 2023

(51) Int. Cl.
| | |
|---|---|
| *H04L 5/00* | (2006.01) |
| *H04W 24/08* | (2009.01) |
| *H04W 24/10* | (2009.01) |
| *H04W 72/231* | (2023.01) |
| *H04W 72/232* | (2023.01) |
| *H04W 72/25* | (2023.01) |
| *H04W 72/40* | (2023.01) |
| *H04W 84/02* | (2009.01) |

(Continued)

(52) U.S. Cl.
CPC .......... *H04W 24/10* (2013.01); *H04L 5/0037* (2013.01); *H04L 5/0048* (2013.01); *H04W 24/08* (2013.01); *H04W 72/231* (2023.01); *H04W 72/232* (2023.01); *H04W 72/25* (2023.01); *H04W 72/40* (2023.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01)

(58) Field of Classification Search
CPC ...... H04B 17/0082–409; H04J 11/0023–0066; H04L 5/0001–0098; H04W 4/30–80; H04W 24/02–10; H04W 72/02–569; H04W 84/005–22; H04W 88/02–12; H04W 92/02–04; H04W 92/08–10; H04W 92/16–18
See application file for complete search history.

(56) References Cited

U.S. PATENT DOCUMENTS

| | | | | |
|---|---|---|---|---|
| 2020/0322024 | A1* | 10/2020 | Cheng | H04W 24/10 |
| 2021/0314962 | A1* | 10/2021 | Ashraf | H04W 72/541 |
| 2022/0132469 | A1 | 4/2022 | Aktas et al. | |

FOREIGN PATENT DOCUMENTS

| | | | | |
|---|---|---|---|---|
| WO | WO-2021154884 A1 * | 8/2021 | | H04W 72/542 |

OTHER PUBLICATIONS

International Search Report and Written Opinion—PCT/US2023/021138—ISA/EPO—Aug. 24, 2023, 11 Pages.

* cited by examiner

*Primary Examiner* — Timothy J Weidner
(74) *Attorney, Agent, or Firm* — Paul M. McAdams; Shumaker & Sieffert, PA

(57) ABSTRACT

Certain aspects of the present disclosure provide techniques for interference measurement and reporting in sidelink. One aspect provides a method of wireless communication by a first user equipment (UE), including receiving signaling indicating resources, within a sidelink resource pool, that are configured for sidelink interference measurement. The method further includes transmitting, to at least a second UE, a first interference report that is based on interference measurements taken on the indicated resources.

36 Claims, 15 Drawing Sheets

(51) Int. Cl.
*H04W 88/02* (2009.01)
*H04W 88/08* (2009.01)
*H04W 92/02* (2009.01)
*H04W 92/10* (2009.01)
*H04W 92/18* (2009.01)

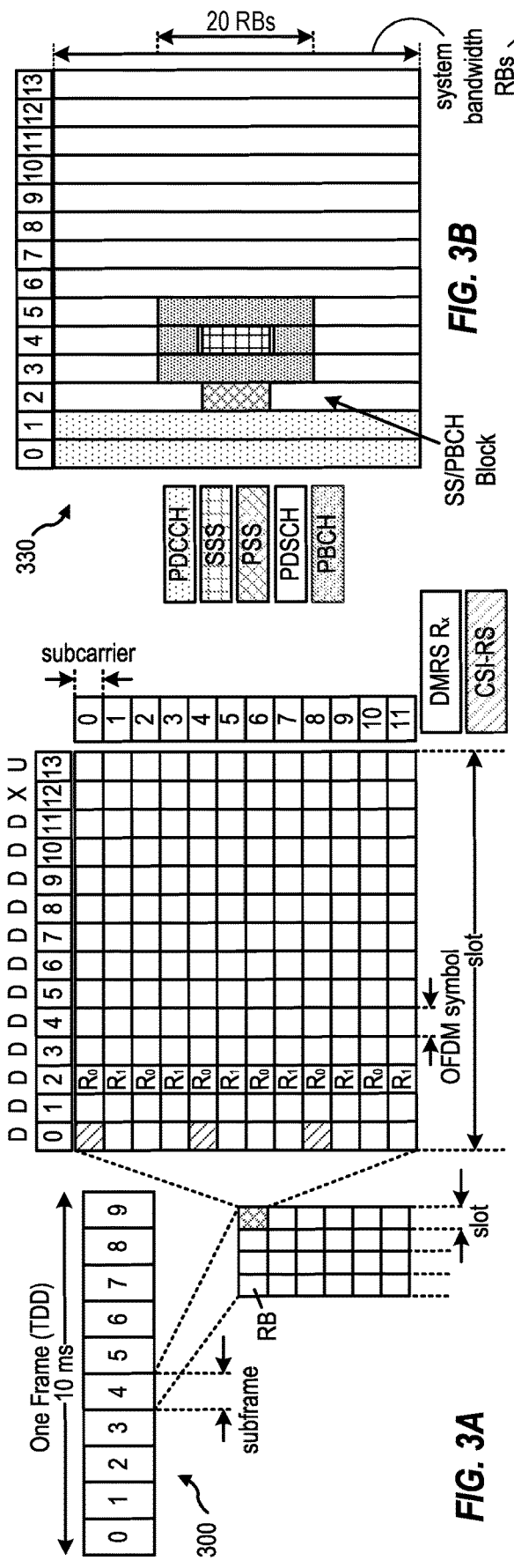

METHODS FOR INTERFERENCE MEASUREMENTS AND REPORTING IN SIDELINK

INTRODUCTION

Aspects of the present disclosure relate to wireless communications, and more particularly, to techniques for interference measurements and reporting in sidelink.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a first user equipment (UE), including receiving signaling indicating resources, within a sidelink resource pool, that are configured for sidelink interference measurement and transmitting, to at least a second UE, a first interference report that is based on interference measurements taken on the indicated resources.

One aspect provides a method of wireless communication by a second user equipment, including receiving, from a first UE, a first interference report that is based on interference measurements taken by the first UE on resources, within a sidelink resource pool, that are configured for sidelink interference measurement and using information in the first interference report to perform channel estimation for a sidelink channel between the first UE and the second UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

DETAILED DESCRIPTION

Figure 1:
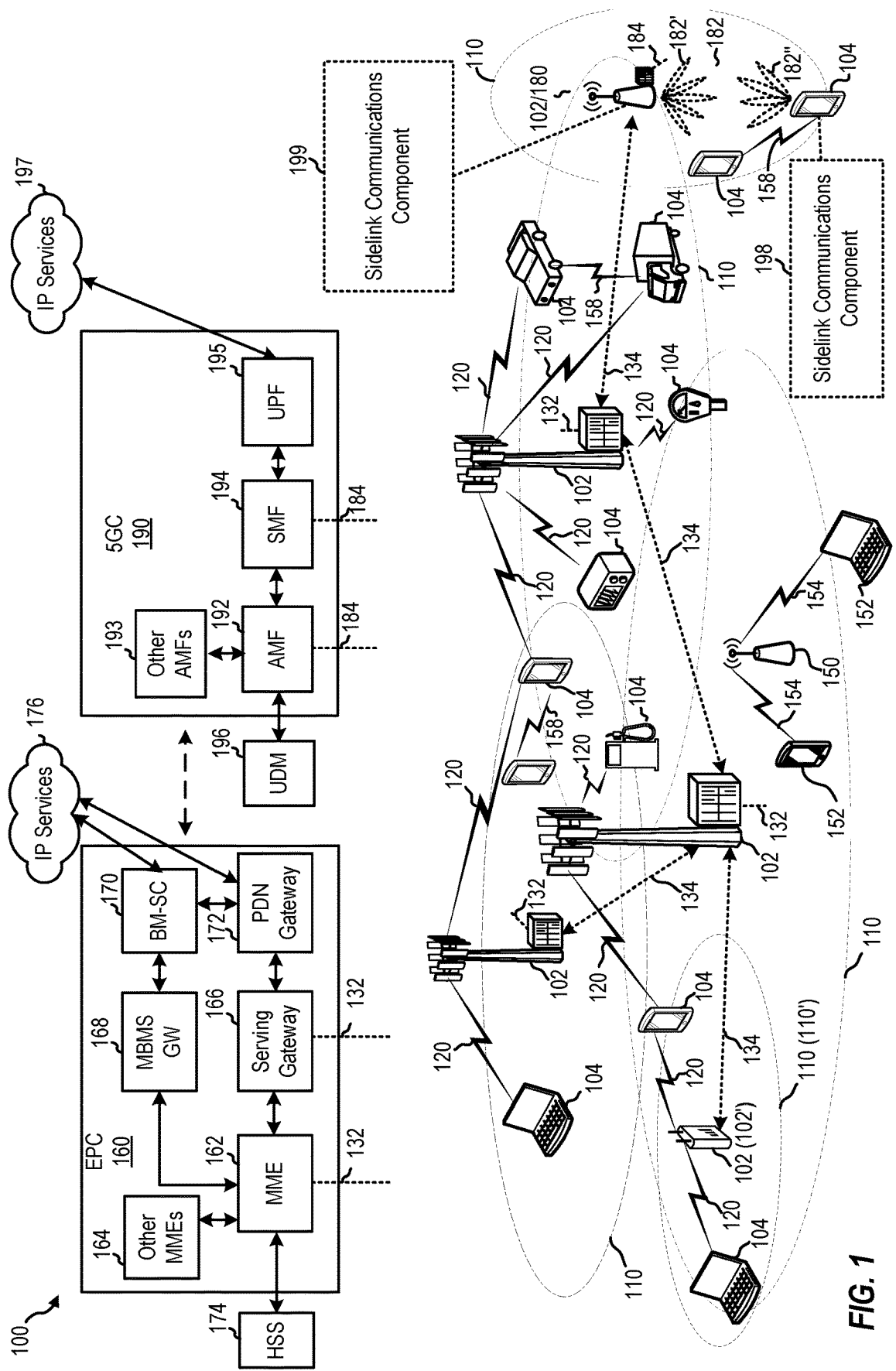
FIG. 1 is a block diagram conceptually illustrating an example wireless communication network.

Aspects of the present disclosure provide apparatuses, methods, processing systems, and computer-readable mediums for interference measurements and reporting in deployments involving sidelink communication between user equipments (UEs).

Various sidelink deployments may support applications with traffic that requires require high reliability, such as ultra-reliable low latency communications (URLLC) traffic. Sidelink applications may also involve virtual reality (VR), augmented reality (AR), or extended reality (XR), that require reliable delivery of traffic with strict timing to avoid adverse impact on user experience. One factor that negatively impacts reliability is interference, for example, from UEs that share a common resource pool (RP) for sidelink communications or other nearby UEs whose transmissions overlap with sidelink transmissions. Unfortunately, there are currently no interference measurement (IM) mechanisms defined for sidelink.

Aspects of the present disclosure, however, provide mechanisms that allow a UE to estimate sidelink interference parameters for the purposes of IM and sidelink IM (SL IM) reporting. SL IM reporting may help improve channel estimation and, as a result, overall reliability.

According to certain aspects, existing resources configured for sidelink communications may be used for IM purposes. For example, configured physical sidelink shared channel (PSSCH) resources and/or demodulated reference signal (DMRS) resources may be punctured or rate matched around to provide resources for interference measurement. One advantage to this approach is that the puncturing or rate matching may be controlled to provide more or less resources for IM purposes, allowing for adaptation to operating conditions. For example, more resources may be used for IM when enhanced reliability is needed (and more interference is observed) or less resources may be used for IM, meaning more resources can be used to increase throughput.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes sidelink communications component 199, which may configure one or more aspects of sidelink communications between user equipments. Wireless communication network 100 further includes sidelink communications component 198, which may be used to configure and perform one or more aspects of sidelink communications with other user equipments.

Figure 2:
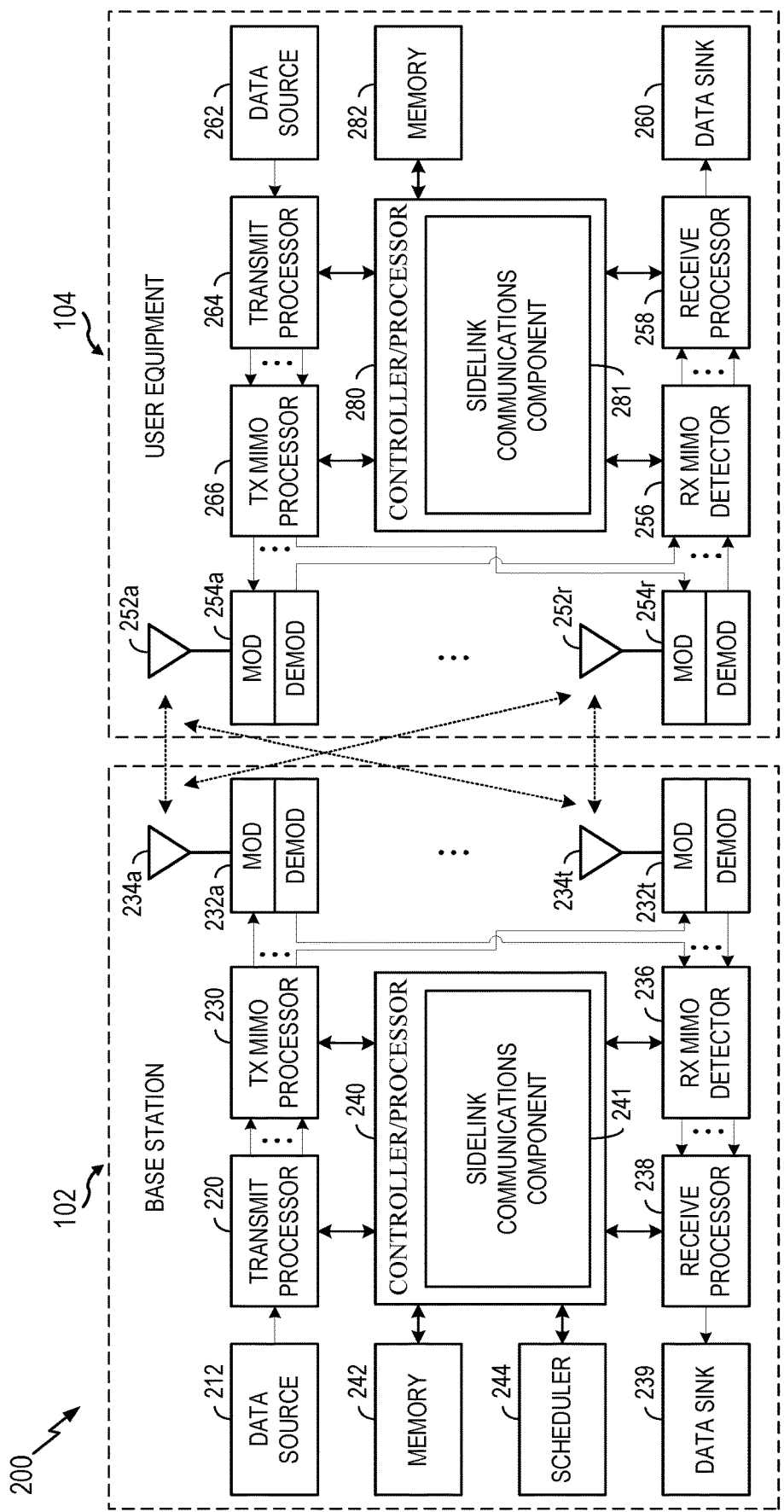
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes sidelink communications component 241, which may be representative of sidelink communications component 199 of FIG. 1. Notably, while depicted as an aspect of controller/processor 240, sidelink communications component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes sidelink communications component 281, which may be representative of sidelink communications component 198 of FIG. 1. Notably, while depicted as an aspect of controller/processor 280, sidelink communications component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Overview of Sidelink Communications

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figures 4, 5:
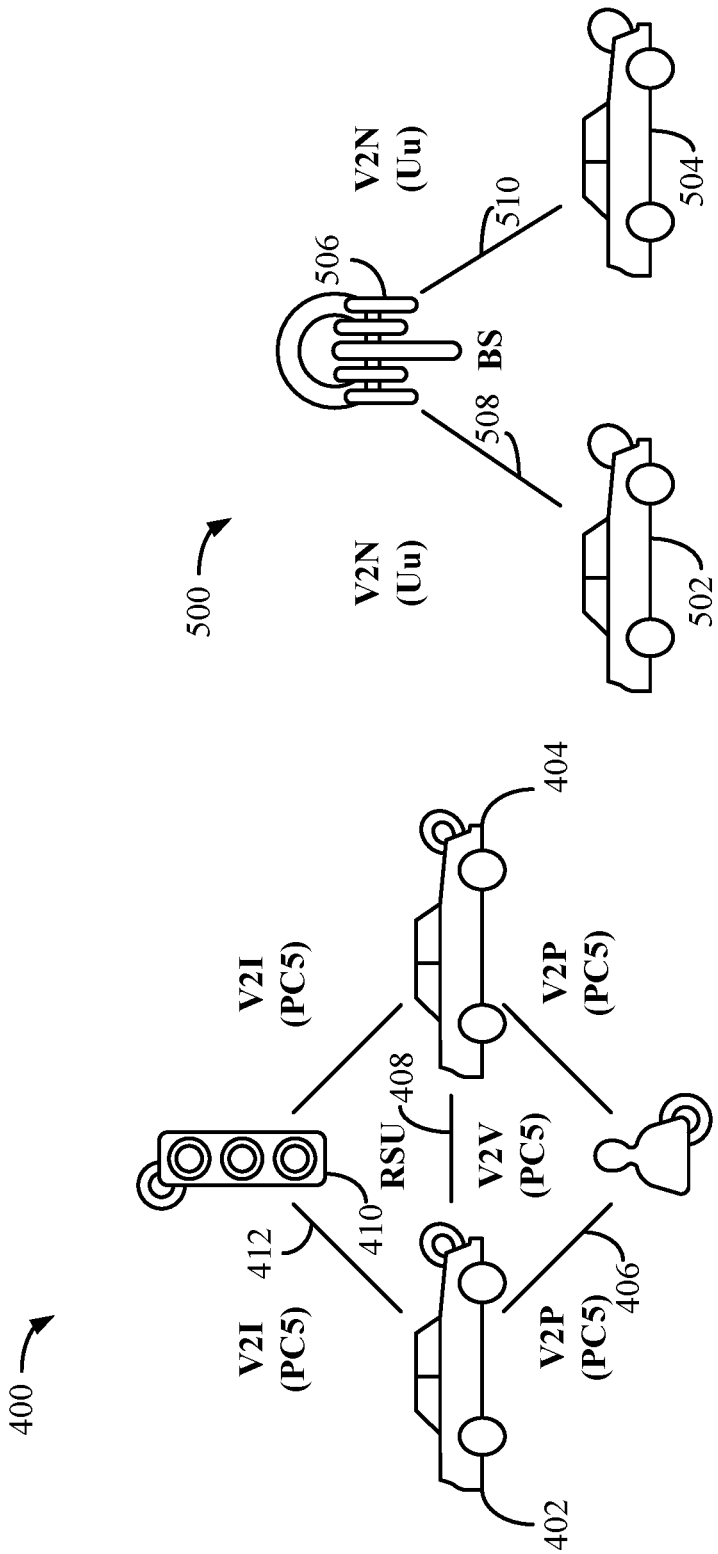
FIG. 4 shows a diagrammatic representation of an example vehicle to everything (V2X) system in accordance with some aspects of the present disclosure.
FIG. 5 shows a diagrammatic representation of another example V2X system in accordance with some aspects of the present disclosure.

FIGS. 4 and 5 show diagrammatic representations of example vehicle to everything (V2X) systems in accordance with some aspects of the present disclosure. For example, the vehicles shown in FIGS. 4 and 5 may communicate via sidelink channels and may perform sidelink CSI reporting as described herein.

The V2X systems, provided in FIGS. 4 and 5, provide two complementary transmission modes. A first transmission mode, shown by way of example in FIG. 4, involves direct communications (for example, also referred to as side link communications) between participants in proximity to one another in a local area. A second transmission mode, shown by way of example in FIG. 5, involves network communications through a network, which may be implemented over a Uu interface (for example, a wireless communication interface between a radio access network (RAN) and a UE).

Referring to FIG. 4, a V2X system 400 (for example, including vehicle-to-vehicle (V2V) communications) is illustrated with two vehicles 402, 404. The first transmission mode allows for direct communication between different participants in a given geographic location. As illustrated, a vehicle can have a wireless communication link 406 with an individual (i.e., vehicle to person (V2P), for example, via a UE) through a PC5 interface. Communications between the vehicles 402 and 404 may also occur through a PC5 interface 408. In a like manner, communication may occur from a vehicle 402 to other highway components (for example, roadside service unit 410), such as a traffic signal or sign (i.e., vehicle to infrastructure (V2I)) through a PC5 interface 412. With respect to each communication link illustrated in FIG. 4, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5 shows a V2X system 500 for communication between a vehicle 502 and a vehicle 504 through a network entity 506. These network communications may occur through discrete nodes, such as a base station (for example, an eNB or gNB), that sends and receives information to and from (for example, relays information between) vehicles 502, 504. The network communications through vehicle to network (V2N) links 508 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications.

Figure 6:
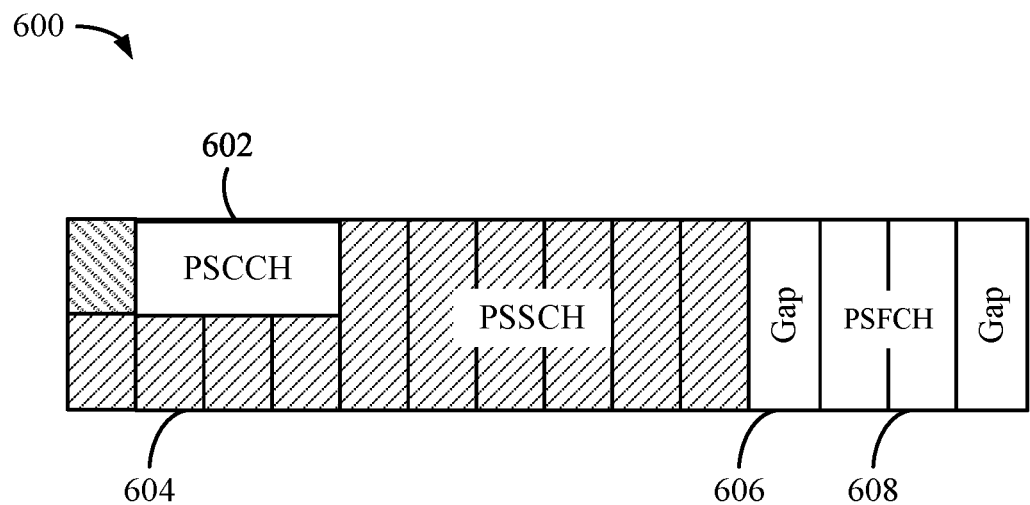
FIG. 6 depicts an example sidelink slot structure.

FIG. 6 depicts an example sidelink slot structure 600. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH) (not pictured), a physical sidelink control channel (PSCCH) 602 (spanning 3 symbols in this example), a physical sidelink shared channel (PSSCH) 604, and a physical sidelink feedback channel (PSFCH) 608. A PSDCH may carry discovery expressions that enable proximal devices to discover each other. The PSCCH 602 may carry control signaling such as sidelink resource configurations and other parameters used for data transmissions, and the PSSCH 604 may carry the data transmissions.

For the operation regarding PSSCH 604, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

Gap symbols 606 correspond to a time in which no signal is allocated, and may be used to pause transmission/reception of signals within the sidelink slot structure 600.

PSFCH 608 may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 7:
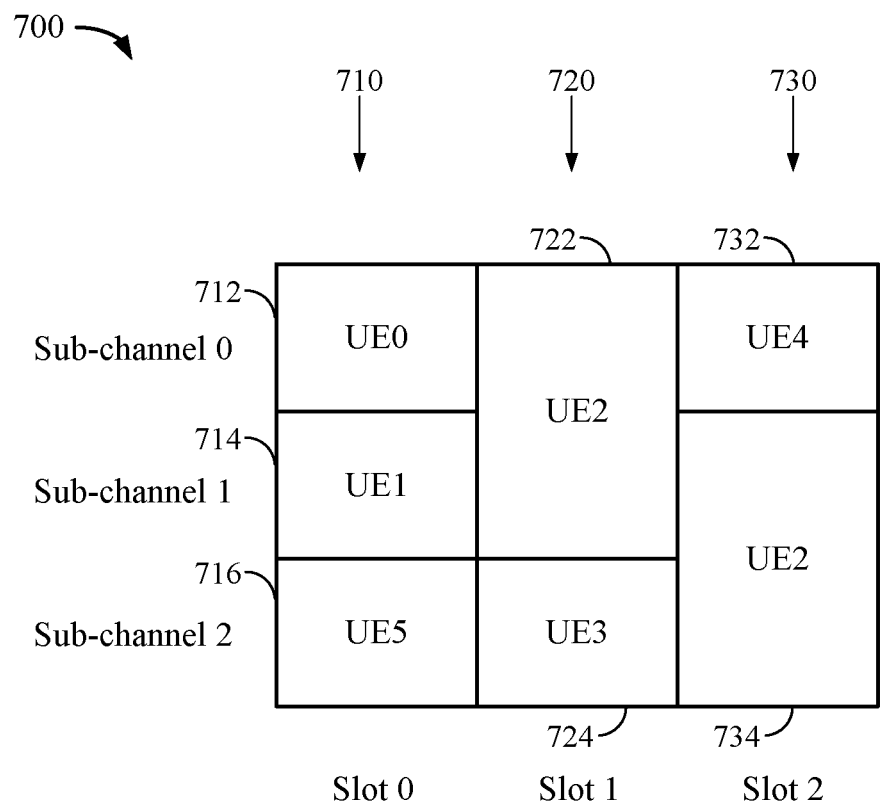
FIG. 7 illustrates an example allocation of a resource pool for sidelink communications, in accordance with certain aspects of the present disclosure.

FIG. 7 is an example of how resources of a common resource pool 700 may be allocated for sidelink communications (broadcast and groupcast device-to-device or D2D) between UEs (e.g., UEs 110 shown in FIG. 1). The common resource pool 700 includes slots 710, 720, and 730 (also referred to as slots 0, 1, and 2). As noted above, with reference to FIGS. 4 and 5, sidelink generally refers to the link between two users, or user-relays can be used in different scenarios and for different applications. As previously described, when a UE is transmitting a sidelink communication on a sub-channel of a frequency band, the UE is typically unable to receive another communication (e.g., another sidelink communication from another UE) in the frequency band. Thus, sidelink communications may be referred to as being half-duplex. As a result, the UEs 0, 1, and 5, which transmit sidelink communications 712, 714, and 716 respectively, cannot receive the sidelink communications from each other. That is, UE 0 cannot receive the sidelink communications 714 and 716. Similarly, UE 2 cannot receive the sidelink transmissions 724 and 732 from UEs 3 and 4, respectively. Also, UE 3 cannot receive sidelink transmission 722 from UE 2, and UE 4 cannot receive the sidelink transmission 734 from UE 2. In aspects of the present disclosure, a sidelink transmission(s) that cannot be received may be referred to as being "erased" for the UE or wireless node that cannot receive the sidelink transmission, because the UE has no information regarding that sidelink transmission. This is unlike other situations in which a UE fails to decode a transmission, because in those situations, the UE may retain some information regarding the transmission that the UE failed to decode, and the UE may combine that retained information with a retransmission that the UE receives to determine the transmission that the UE failed to decode.

According to previously known techniques, resource allocation is reservation based in NR sidelink communications. In these techniques, resource allocations are made in units of sub-channels in the frequency domain and are limited to one slot in the time domain. In the previously known techniques, a transmission may reserve resources in the current slot and in up to two future slots. Reservation information may be carried in sidelink control information (SCI).

In some cases, sidelink control information (SCI) may be transmitted in two stages. A first stage SCI (SCI-1) may be transmitted on a physical sidelink control channel (PSCCH) and contains resource reservation information as well as information needed to decode a second stage SCI (SCI-2). A SCI-2 may be transmitted on the physical sidelink shared channel (PSSCH) and contains information needed to decode data on the shared channel (SCH) and to provide feedback (e.g., acknowledgments (ACKs) or negative acknowledgments (NAKs)) over the physical sidelink feedback channel (PSFCH).

One example use case of sidelink communication involves communication between a controller (such as a programmable logic controller, "PLC") and one or more wireless devices. The types of wireless devices could vary based on the type of deployment. For example, in a factory automation deployment, a PLC may communicate with sensor/actuators (S/As). In a multimedia deployment (e.g., VR, AR, or XR), as illustrated in FIG. 8, a PLC may communicate with wearables.

Both the PLC and the wearable may generally be referred to as UE in this disclosure. In some cases, when the PLC transmits to a wearable, the PLC may be referred to as the transmitter UE, and the wearable may be referred to as the receiver UE. In some cases, when the PLC receives transmissions from a wearable, the PLC may be referred to as the receiver UE, and the wearable may be referred to as the transmitter UE. The designation of the transmitter UE and the receiver UE thus depends on specific operations or circumstances, and is not bound to a device as a permanent or constant attribute.

Figure 8:
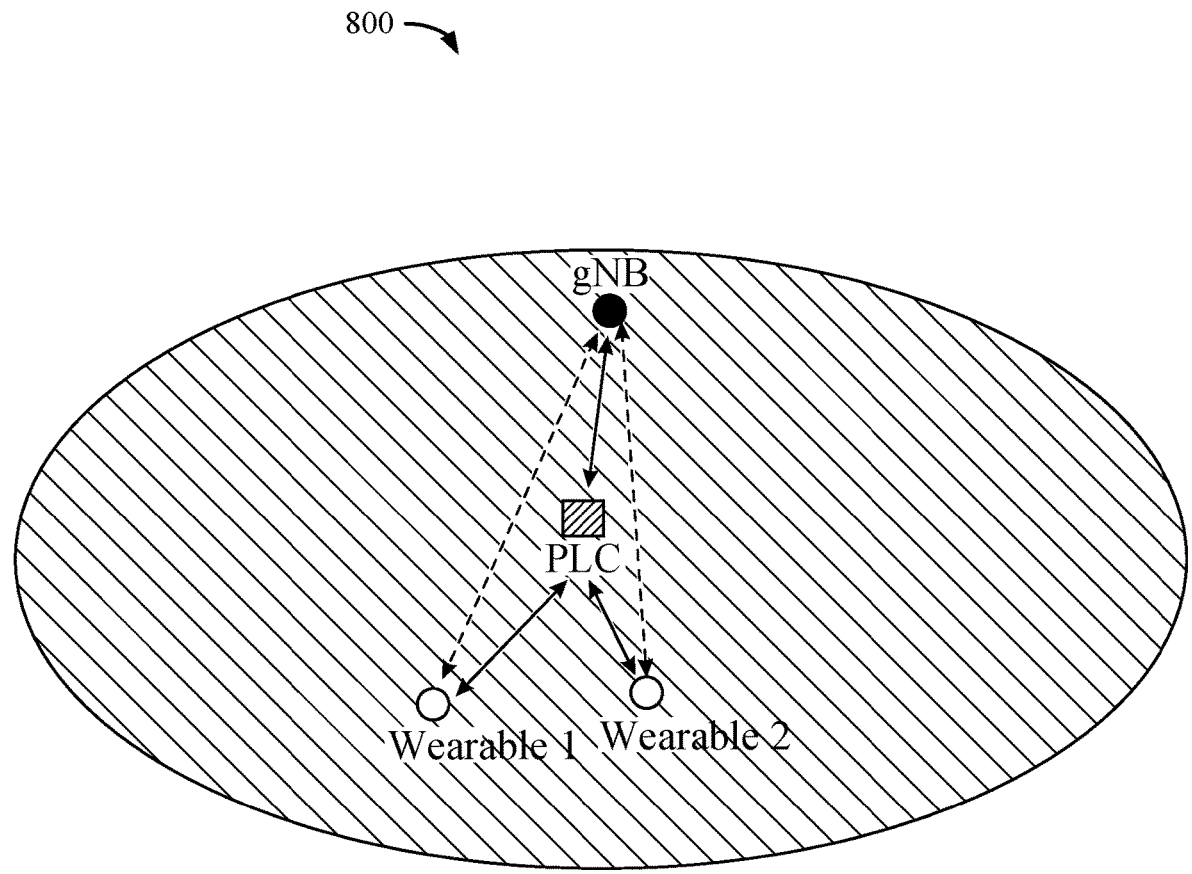
FIG. 8 illustrates an example sidelink deployment, in accordance with certain aspects of the present disclosure.

The example deployment shown in FIG. 8 involves a PLC and two wearables (Wearable 1 and Wearable 2). As shown, the PLC may communicate with the gNB (e.g., via a Uu-interface) and may communicate with wearable 1 and wearable 2 through sidelink (e.g., PC5) interfaces.

Aspects Related to Interference Measurements and Reporting in Sidelink

Aspects of the present disclosure provide apparatuses, methods, processing systems, and computer-readable mediums for interference measurements and reporting in deployments involving sidelink communication between user equipments (UEs). The mechanisms proposed herein may help mitigate the adverse impact of interference in various sidelink deployments involving applications that require reliable sidelink communications, such as VR, AR, and XR.

According to certain aspects, existing resources configured for sidelink communications may be used for IM purposes. As will be described in greater detail below, configured PSSCH and/or DMRS resources may be repurposed for interference measurement, via puncturing and/or rate matching. The puncturing or rate matching may be controlled to provide more or less resources for IM purposes, providing flexibility to adapt to operating conditions or needs. Switching between puncturing and rate matching may also be controlled.

In some cases, dedicated resources may be provided for sidelink IM. For example, in some cases sidelink channel state information IM (SL-CSI-TM resources) or sidelink zero power CSI reference signal (SL-ZP-CSI-RS) resources may be configured for SL IM purposes. In some cases, some sidelink reference signal (SL-RS) resource may be re-purposed for IM reporting, for example, by puncturing. The amount of SL-RS repurposed for IM purposes may also be controlled to adapt to varying conditions. For example, more SL-RS resources may be punctured and used for IM purposes (rather than for SL-RS) when UEs are experiencing low delay spread channels with frequency selective interference (e.g., SL-RS resources may be punctured that span an entire resource block).

Figure 9:
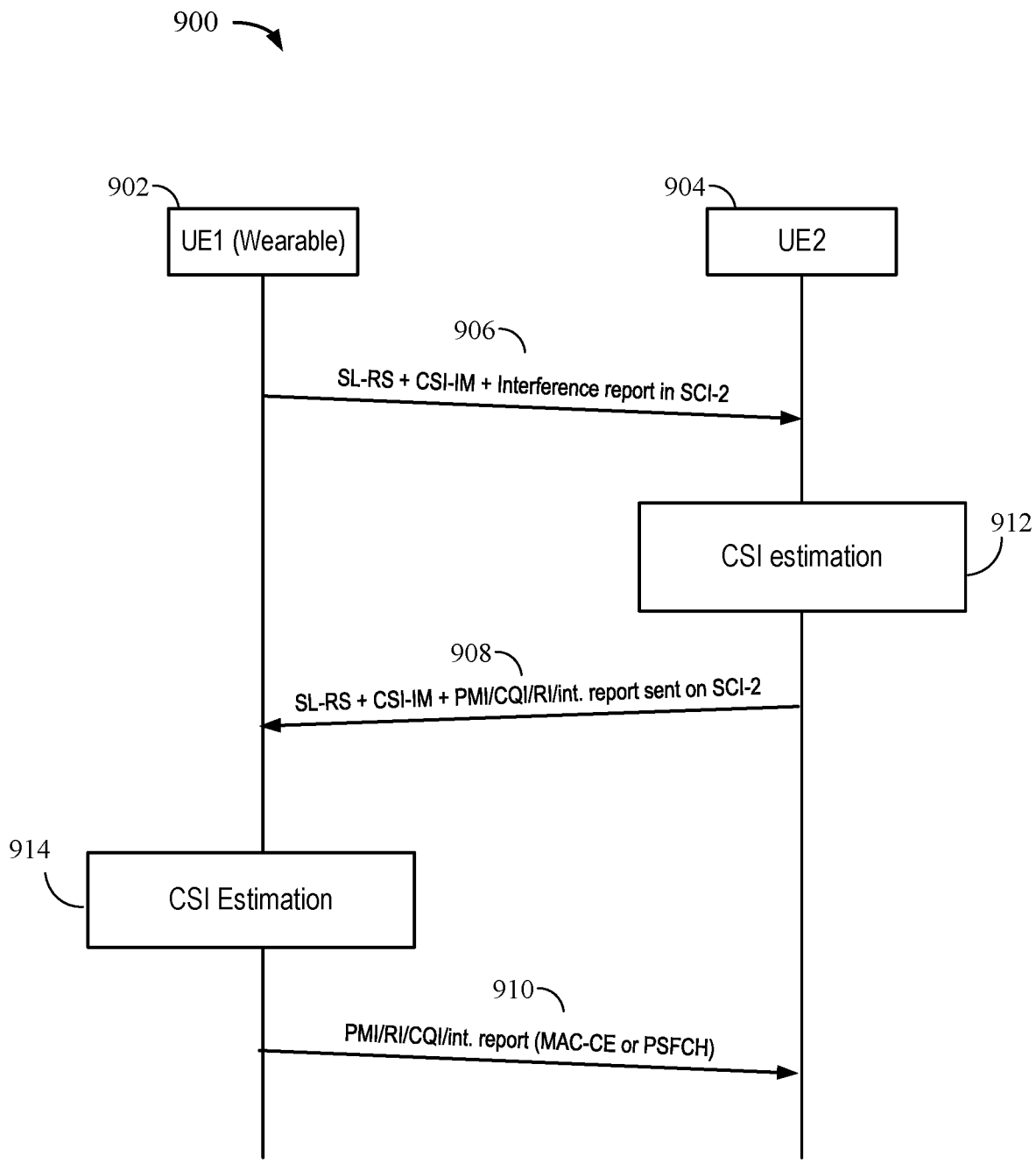
FIG. 9 illustrates an example call flow diagram, in accordance with certain aspects of the present disclosure.

The call flow diagram 900 of FIG. 9 illustrates one example of SL IM reporting between two UEs (a wearable/UE1 902 and UE2 904). In such a scenario, from the perspective of the wearable, UE2 may be operating as a base station (e.g., of a small cell).

In the illustrated example, at 906, the wearable transmits sidelink reference signals (SL-RS) and an interference report to UE2. SL-RS may be analogous to sounding reference signals (SRS) that a UE sends on the Uu (cellular) link for a base station to measure uplink channel conditions.

In one aspect, the interference report includes a thermal and interference report. In another aspect, the interference report includes an interference-only report. The interference report includes one of interference-plus-noise covariance matrix, interference power, interference rank, or interference eigenvalues. The number of non-zero eigenvalues may determine the transmission rank. The interference report is transmitting in a second stage of two-stage SCI (e.g., SCI-2).

In some cases, gap symbols (e.g., such as gap symbols 606 shown in FIG. 6) configured per resource pool (RP) can be utilized by UEs that share a common sidelink RP to estimate the thermal noise (e.g., assuming there is no interference from the other UEs sharing the RP in these gaps). Gap symbols may also be used by UEs that share the RP to estimate interference from UEs that do not share the RP. Based on switching between transmit (TX) and receive (RX) circuits, a UE can use part of the gap symbols to perform the measurements above.

While not shown, UE1 may have generated the interference report based on measurements taken on resources configured for IM (e.g., CSI-IM) during a previous transmission from UE2 to the wearable. As an alternative, or in addition, the interference report may be generated based on punctured resources (PSSCH/DMRS) from previous a transmission from UE2 to the wearable.

As illustrated, at 908, UE2 may perform channel state information (CSI) estimation, for example, based on SL-RS transmitted from the wearable. UE2 may also use the interference report to improve CSI estimation, allowing UE2 to generate a whitened channel estimate, by reducing/removing the effects of (colored) interference. These channel estimates may be considered improved relative to non-whitened channel estimates and may help improve performance.

In some cases, the CSI estimation results in channel quality indicator (CQI), rank indicator (RI), and/or precoding matrix indicator (PMI) values. In some cases, at 910, the UE2 may send/report this information to the wearable. In other cases, rather than reporting the CQI, RI, and/or PMI values to the wearable, UE2 may use this information to determine transmission parameters (precoder, PMI, RI, and/or modulating and coding scheme-MCS) for a subsequent transmission from UE2 to the wearable.

Assuming reciprocity and even symmetric interference (e.g., meaning the impact of interference is substantially the same at both TX-side and the RX-side), then UE2 can perform channel state feedback (CSF). For example, as noted above, UE2 may take the interference report (from the wearable) into account when performing CSI estimation. If this is the case, then the report (e.g., PMI/CQI/RI) sent from the UE to the wearable at 910 may be used to help the wearable determine transmission parameters for subsequent transmissions to UE2. The wearable may use information received (at 910) when performing CSI estimation (at 912) to determine transmission parameters (for a subsequent transmission at 914). The transmission, at 914, may include a subsequent interference report and/or other feedback (e.g., included in a MAC-CE or PSFCH).

In some cases, UE2 may determine whether it is useful or not to send an interference report (generated by UE2) to the wearable, if they experience the same interference nature (e.g., as indicated by a comparison of interference parameters generated at UE2 to interference parameters in the report received from the wearable). In some cases, UE2 may add a flag in SCI-2 indicating whether an interference report generated by UE2 is included (or whether the wearable should use the interference report that it sent UE2). If a report is received from UE2, the wearable may use this information to enhance CSI estimation (at 912), for example, using whitening.

Figure 10:
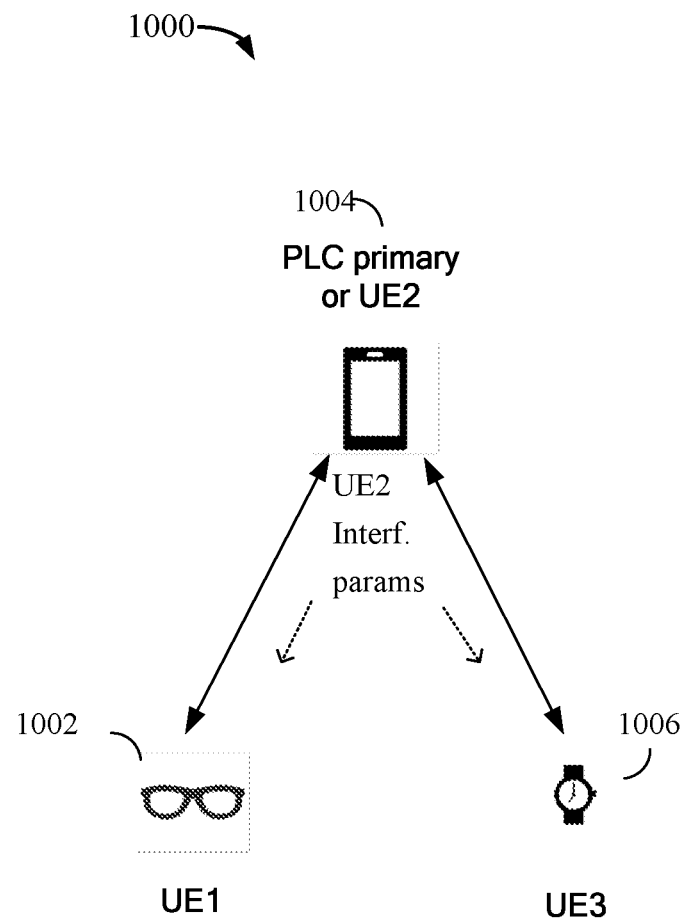
FIG. 10 illustrates an example sidelink deployment, in accordance with some aspects of the present disclosure.

While the example shown in FIG. 9 involves a UE (UE2) in communication with a wearable (UE1), in some cases, a UE serving as a primary UE (e.g., a PLC) may be in communication with multiple wearables. For example, as shown in FIG. 10 a UE2 1004 (acting as a PLC or primary UE) may be in communication with a first wearable (UE1 1002) and a second wearable (UE3 1006). In some cases, UE2 may sends common sidelink reference signal SL-RS (which could be across RP or could be wideband RS) to other UEs, in addition to sending UE-specific SL-RS. In some cases, UE2 can signal its interference parameters (e.g., reporting interference-plus-noise covariance matrix, rank, as described above). In such cases, UE1 and UE3 may compute PMI/RI/CQI based on estimated channels and reported interference (as described above).

Rate matching generally refers to matching an amount of data transmitted to an amount of available resources for transmission, which can dynamically. Puncturing refers to a form of rate matching. In puncturing, some coded output bits are not transmitted to meet a rate matching output size. Puncturing may be considered a way of how to select the position (time/frequency resource) of non-transmitted signals.

According to certain aspects, existing resources configured for sidelink communications may be used for IM purposes. As will be described in greater detail below, configured PSSCH and/or DMRS resources may be repurposed for interference measurement, via puncturing and/or rate matching. The puncturing or rate matching may be controlled to provide more or less resources for IM purposes, providing flexibility to adapt to operating conditions or needs. Switching between puncturing and rate matching may also be controlled.

Figure 11:
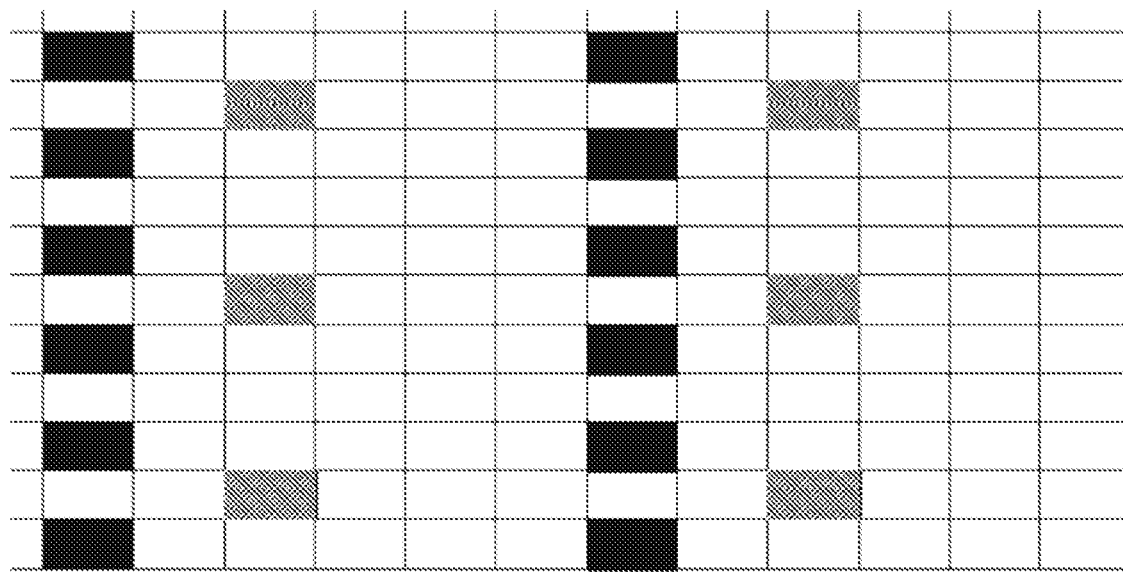
FIG. 11 illustrates an example of resources that may be used for interference measurement, in accordance with certain aspects of the present disclosure.

As noted above, in some cases, configured sidelink resources may be punctured for IM purposes. For example, SL-RS resources may be punctured and used for IM purposes. Similarly, resource elements (REs) of PSSCH 1102 and/or DMRS 1104 as illustrated in FIG. 11, may be punctured and used for IM purposes. As noted above, the amount of resources (e.g., SL-RS, PSSCH, and/or DMRS) repurposed for IM purposes may also be controlled to adapt to varying conditions or performance objectives. In some cases, different puncturing patterns may be used to vary the location and/or number of punctured resources. For example, one or more patterns may indicate a relatively dense set of resources to puncture, while one or more other patterns may indicate a relatively sparse set of resources to puncture.

There are various options for indicating how puncturing is to be performed (e.g., a puncturing pattern), for example, for SL-RS, DMRS and/or PSSCH. In some cases, the transmitting UE may puncture resources for DMRS/PSSCH transmissions based on one or more configured puncturing patterns.

In some cases, a UE may be configured (e.g., via PC5-RRC or MAC-CE) with a configuration for DMRS or PSSCH puncturing. In some cases, the configuration may apply across all resource pools (RPs). In some cases, a puncturing pattern may be defined for DMRS or PSSCH per RP (e.g., different RPs may have different puncturing patterns). In some cases, per RP puncturing may be configured via Uu RRC signaling.

In some cases, multiple puncturing patterns may be defined for DMRS or for PSSCH and a TX-UE may select one of the patterns. In some cases, the selection may be based on a suggestion from a RX-UE, sent on PSFCH or MAC-CE or a piggyback on PSSCH. The suggestion may be indicated, for example, by providing an index (e.g., a 4 bit index to select one of 16 patterns) and may be considered a suggestion because the TX-UE may make the ultimate selection. In such cases, the TX-UE may indicate the actual selected pattern to RX-UE, for example, using PC5-RRC/ MAC-CE or SCI-2 or piggybacked on PSSCH.

There are various options for puncturing sidelink resources. For example, according to one option, resources for some DMRS REs or set of REs per an RB may be punctured, or an entire RB may be punctured with a certain defined bitmap or comb level per RB (e.g., where a comb indicates certain subcarriers).

According to a second option, resources for PSSCH may be punctured based on a certain comb level and comb offset (or certain pattern). In such cases, there are various alternatives for the PSSCH resource allocation. According to a first alternative, the TX-UE may rate match PSSCH around the punctured resources. This case may be similar to how ZP-CSI-RS resources may be used in a downlink physical downlink shared channel (DL/PDSCH) transmission. In some cases, multiple resources may be associated with PSSCH and can be configured as described above. According to a second alternative, the TX-UE may puncture PSSCH at the configured resources (e.g., as if those resources are lost/erased).

There are also various options for indicating if a transmission is being sent with puncturing, but without rate match being enabled or not (e.g., no rate matching, remove of resources and associated bits). According to a first option, when an RX-UE receives a PSSCH, the SCI may include an indicator (e.g., a flag) that indicates whether the scheduled channel is punctured or not. A first value of this indicator may indicate puncturing is enabled and the RX-UE may assume PSSCH has been punctured. A second value of this indicator may indicates puncturing is disabled and the RX-UE may assume PSSCH has been not been punctured.

According to a second option, the TX-UE can use certain radio network temporary identifiers (RNTIs) for SCIs (e.g., for SCI-2) or for certain SCI formats, to indicate if puncturing is applied to a PSSCH/DMRS scheduled by those SCIs. According to a third option, a gNB (e.g., in the scheduling mode described with reference to FIG. 5) configures rules for the TX-UE and RX-UE to determine how puncturing is done. The rules may involve new configured RNTIs for indicating puncturing, specific DCI formats, search spaces, and/or control resource set (CORESET) associations with the DCI. In such cases, puncturing may be applied to the PSSCH by the DCI, for example, to a semi-persistently scheduled (SPS) activation DCI in SL (e.g., configured grant type 2).

In some cases, puncturing may be enabled for DMRS-only, for PSSCH-only, or for both DMRS and PSSCH. In some cases, such enablement may be per RP, such that different RPs may have different types of puncturing enabled (or not enabled). In some cases, if puncturing is enabled, then a TX-UE can decide to use it or may include an indication of the decision (e.g., in SCI-2). In some cases, if both DMRS puncturing and PSSCH puncturing are enabled, a UE can decide whether to use one of them (or both), for example, based on some feedback from an RX-UE, based on some CSI estimation, and/or TB size.

In some cases, for rate matching, SL-ZP-CSI-RS resources can be added to PSSCH configured per resource pool. As noted above, the SL-ZP-CSI-RS resources may be used for IM measurement. In such cases, the feature could be enabled or disabled per resource pool.

The techniques and options described above for configuring, enabling, and indicating PSSCH and/or DMRS may also be applied for SL-RS puncturing. In some cases, similar to PSSCH/DMRS puncturing, different patterns for SL-RS puncturing may be used. This may be useful, for example, when high density CSI-RS is used for SL-RS. In some cases, a SL-RS puncturing pattern can be a certain comb level and comb offset per RE. In some cases, the comb level could be applied on an RB level. In such cases, for example, every other RB of SL-RS may be punctured, and interference could be measured across different RBs.

As noted above, in some cases, dedicated sidelink resources may be provided for SL IM purposes. Such resources may be referred to as sidelink channel state information interference measurement (SL-CSI-IM) resources.

In some cases, one or more SL-CSI-IM resource(s) may be configured per SL resource pool. In some cases, a gNB may configure a same set of resources across all RPs. In some cases, a resource pool may be configured with multiple CSI-IM patterns. In such cases, a TX-UE may select one or more of the patterns in SCI-2. For example, the selection may be based on CSI, interference level measurements, a transport block size (TBS), and/or whether there is a corresponding need to use all resources for data or channel estimation.

In some cases, a gNB can selectively associate (e.g., toggle) CSI-RS (SL-RS) resources with CSI-IM resources. In such cases, when CSI-RS and CSI-IM resources are associated, a single trigger (ID) by a TX-UE may trigger both resources. In some cases, there may be a defined report ID for SL. In such cases, an RX-UE may use both the SL-RS and SL-CSI-IM to measure CSI and also to generate an interference report.

There are various options regarding how to transmit the interference report. For example, an interference report could be transmitted via PSFCH, MAC-CE, or transmitted with (piggybacked on) a PSSCH. As far as report triggering, in some cases, a UE may send the interference report if a report configuration (which has an ID) has a report quantity (flag) set to ON, that indicates interference report inclusion. As described above with reference to FIG. 9, an interference report can be signaled in an SCI-2, while also triggering SL-RS (and/or SL-CSI-IM) resources at another UE.

UEs can use received interference reports for various purposes. For example, UEs can use received interference reports along with their own interference measurements to determine whether the interference is symmetric or at least has same or similar characteristics. Based on this determination, a UE may decide whether or not it should send its own interference report (e.g., if the determination is interference is symmetric, signaling overhead may be saved by not sending an additional interference report).

In some cases, using various signaling (e.g., PC-5RRC/ MAC-CE signaling), the UEs may decide to include an interference report or not. In other cases, the gNB may enable interference reporting, for example, using RRC/ MAC-CE or DCI signaling to the UE.

Figure 12:
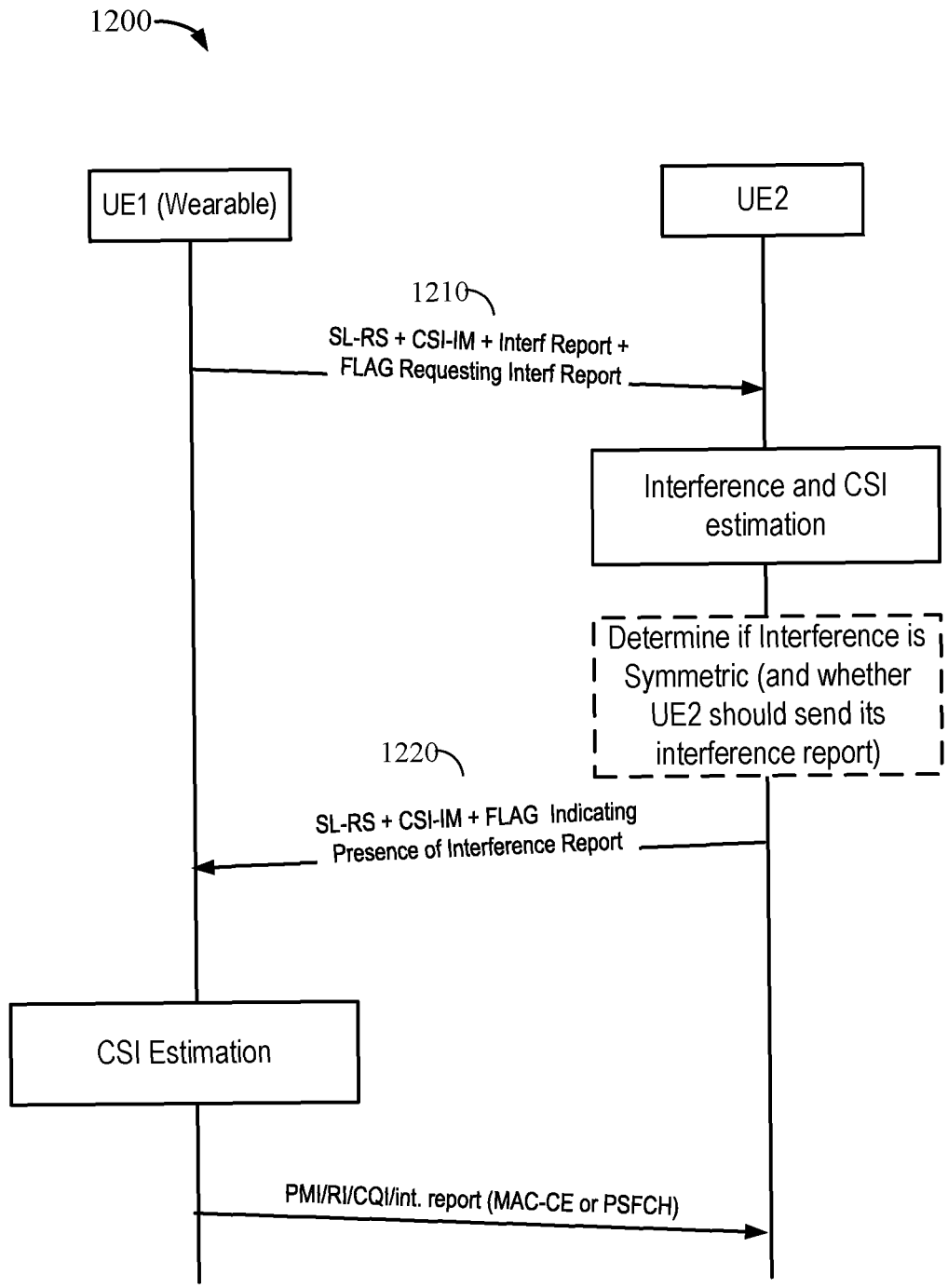
FIG. 12 illustrates an example call flow diagram, in accordance with certain aspects of the present disclosure.

As shown at 1210, in FIG. 12, a UE (e.g., wearable UE1) may indicate to the other UE (UE2) using SCI-2, whether it requests the other UE to send an interference report. As illustrated, this indication may be included with the SCI-2 while sending the SL-RS and indicating the puncturing/ using CSI-IM or not). As illustrated at 1220, UE2 may also use a flag to indicate whether an SCI-2 it sends includes an interference report. For example, UE2 may determine interference is symmetric and, based on this determination, may decide not to send an interference report.

As described herein, aspects of the present disclosure provide mechanisms that allow a UE to estimate sidelink interference parameters for the purposes of IM and sidelink IM reporting, which may help improve channel estimation and, thus, overall system performance. The mechanisms described herein may allow for the amount of IM resources to be adapted based on varying conditions.

Example Methods

Figure 13:
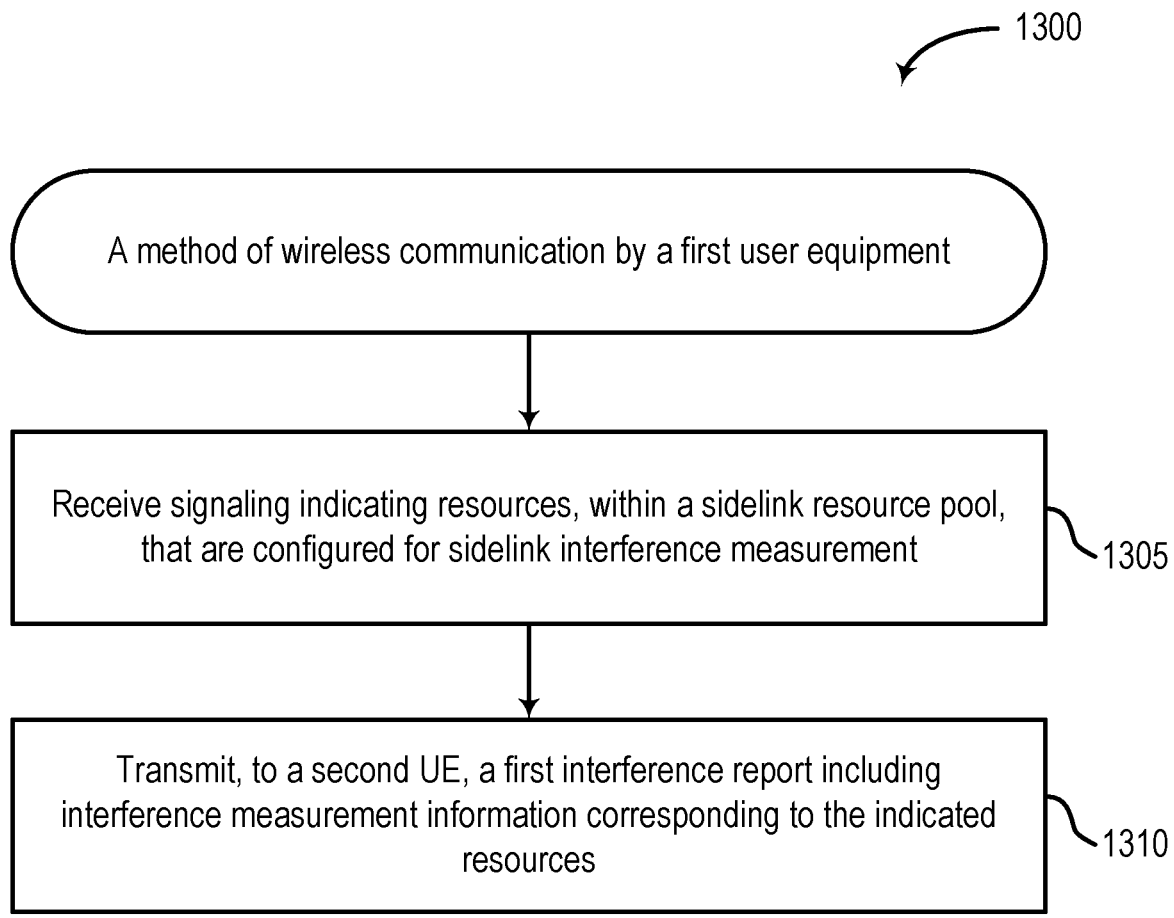
FIGS. 13 and 14 depict example processes of wireless communication according to aspects of the present disclosure.

FIG. 13 shows an example of a method 1300 for wireless communication according to aspects of the present disclosure. In some aspects, a user equipment, such as UE 104 of FIGS. 1 and 2, or processing system 1505 of FIG. 15, may perform the method 1300.

Method 1300 begins at step 1305 with receiving signaling indicating resources, within a sidelink resource pool, that are configured for sidelink interference measurement. In some cases, the operations of this step refer to, or may be performed by, resource configuration circuitry as described with reference to FIG. 15.

Method 1300 then proceeds to step 1310 with transmitting, to at least a second UE, a first interference report including interference measurement information corresponding to the indicated resources. In some cases, the operations of this step refer to, or may be performed by, interference measurement circuitry as described with reference to FIG. 15.

In some aspects, the first interference report indicates at least one of an interference-plus-noise covariance matrix, an interference power, an interference rank, or interference eigenvalues. In some aspects, the first interference report is transmitted in a second stage of two-stage SCI.

In some aspects, the method 1300 further includes receiving, from the second UE, SCI including information generated by the second UE based on the first interference report. In some aspects, the method 1300 further includes determining, using at least one of the information or SL-RS received with the SCI, transmit parameters. In some aspects, the method 1300 further includes transmitting a sidelink transmission to the second UE using the determined transmit parameters.

In some aspects, the information included in the SCI comprises at least one of a second interference report generated by the second UE or an indication that the first interference report is suitable for the first UE to use to determine the transmit parameters.

In some aspects, the first UE is a primary UE and the first UE transmits the first interference report to a third UE.

In some aspects, the signaling indicates a puncturing pattern for puncturing resources of at least one of PSSCH resources, a DMRS, or SL-RS. In some aspects, the puncturing pattern is indicated in a sidelink RRC signaled configuration or MAC CE signaled configuration, and wherein the puncturing pattern applies to multiple sidelink resource pools. In some aspects, the different puncturing patterns are defined for different sidelink resource pools. In some aspects, the puncturing pattern comprises a puncturing pattern selected from a plurality of configured puncturing patterns. In some aspects, the puncturing pattern is selected based on a suggestion by the first UE. In some aspects, the puncturing pattern indicates resources to be punctured within one or more DMRS REs within a RB or one or more sets of DMRS REs within an RB. In some aspects, the puncturing pattern indicates PSSCH resources to be punctured based on at least one of a comb level or comb offset.

In some aspects, the method 1300 further includes determining whether the puncturing pattern is applied to a scheduled PSSCH. In some aspects, the determination is based on at least one of a RNTI value, SCI content, an SCI format, or a rule. In some aspects, the method 1300 further includes determining whether the puncturing pattern is applied to DMRS only, PSSCH only, or both DMRS and PSSCH. In some aspects, the puncturing pattern indicates a pattern of SL-RS resources to puncture associated with a comb of REs within a RB or particular REs within the RB. In some aspects, the puncturing pattern further indicates RBs in which the puncturing pattern is to be applied.

In some aspects, the resources indicated by the signaling comprise SL-CSI-IM resources. In some aspects, the signaling indicates one or more SL-CSI-IM resources configured per sidelink resource pool. In some aspects, a same set of SL-CSI-IM resources is configured across multiple sidelink resource pools. In some aspects, at least one sidelink resource pool is configured with multiple SL-CSI-IM patterns. In some aspects, the first UE receives an indication of one or more of the multiple SL-CSI-IM patterns via SCI.

In some aspects, the method 1300 further includes receiving signaling from a network entity indicating whether the first UE is to use SL-RS, SL-CSI-IM, or both SL-RS and SL-CSI-IM for the interference measurements on which the first interference report is based. In some aspects, the first interference report is transmitted in at least one of a PSFCH, MAC CE, or a physical sidelink shared channel.

In some aspects, the method 1300 further includes receiving a second interference report from the second UE. In some aspects, the method 1300 further includes determining, based on the first interference report and the second interference report, whether interference determined at the first UE and interference determined at the second UE has same or similar characteristics. In some aspects, the resources indicated by the signaling comprise SL-ZP-CSI-RS.

In some aspects, the method 1300 further includes receiving, prior to transmitting the first interference report, signaling indicating whether the first UE is to transmit the first interference report.

In some aspects, the method 1300 further includes transmitting, to the second UE, SCI that includes an indication of whether the second UE is to transmit, to the first UE, a second interference report generated by the second UE.

Figure 14:
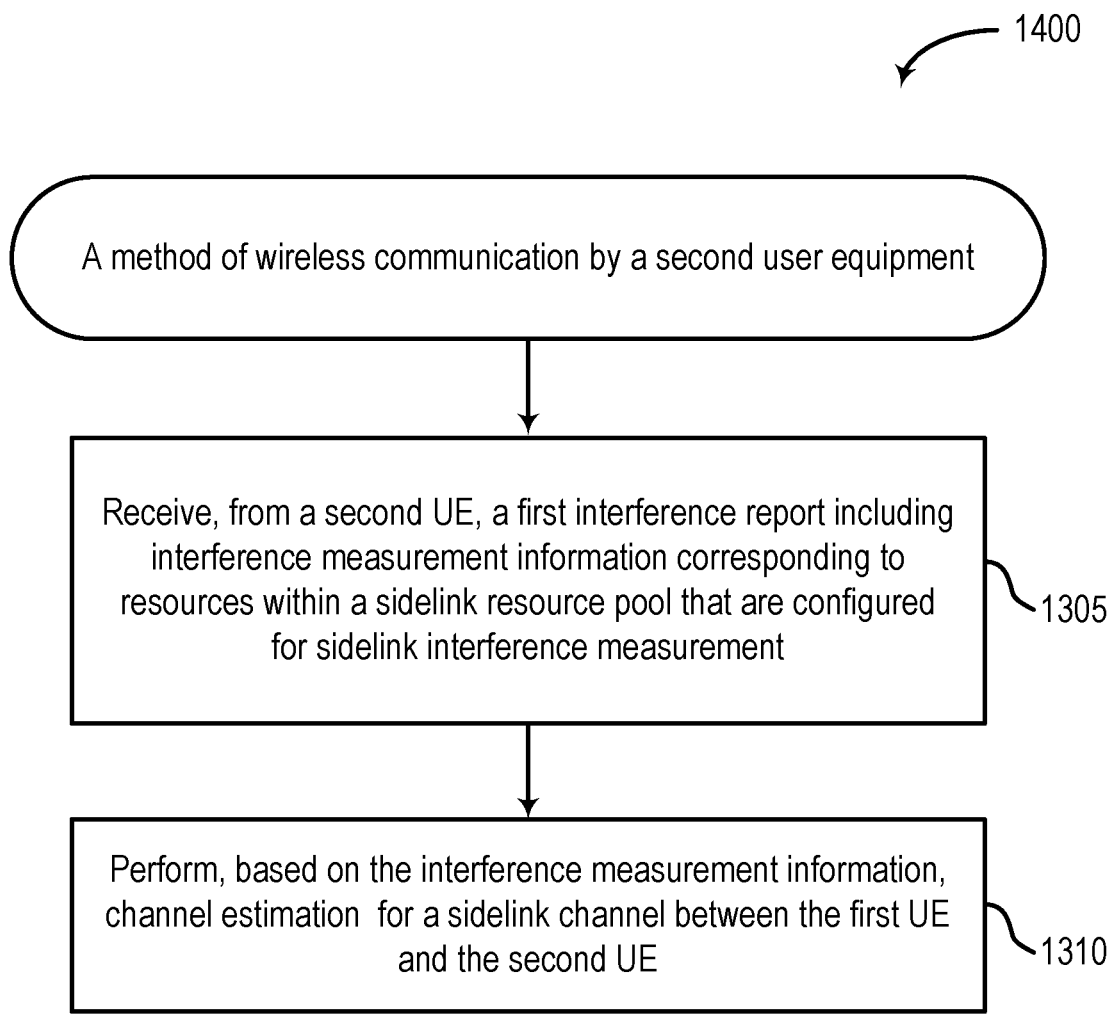

FIG. 14 shows an example of a method 1400 for wireless communication according to aspects of the present disclosure. In some aspects, a user equipment, such as UE 104 of FIGS. 1 and 2, or processing system 1605 of FIG. 16, may perform the method 1400.

Method 1400 begins at step 1405 with receiving, from a second UE, a first interference report including interference measurement information corresponding to resources within a sidelink resource pool that are configured for sidelink interference measurement. In some cases, the operations of this step refer to, or may be performed by, interference report circuitry as described with reference to FIG. 16.

Method 1400 then proceeds to step 1410 with performing, based on the interference measurement information, channel estimation for a sidelink channel between the first UE and the second UE. In some cases, the operations of this step refer to, or may be performed by, channel estimation circuitry as described with reference to FIG. 16.

In some aspects, the first interference report indicates at least one of an interference-plus-noise covariance matrix, an interference power, an interference rank, or interference eigenvalues. In some aspects, the first interference report is received in a second stage of two-stage SCI.

In some aspects, the method 1400 further includes transmitting, to the first UE, SCI including at least one of information generated by the second UE based on the first interference report or a second interference report generated by the second UE.

In some aspects, the information included in the SCI comprises at least one of the second interference report generated by the second UE or an indication that the first interference report is suitable for the first UE to use to determine transmit parameters.

In some aspects, the method 1400 further includes receiving, from the first UE, an indication for the second UE to transmit the second interference report. In some aspects, the method 1400 further includes including the second interference report in the SCI based on the indication.

In some aspects, the method 1400 further includes determining the first interference report is suitable for the first UE to use to determine transmit parameters by comparing interference parameters included in the first interference report to interference parameters generated at the second UE. In some aspects, the method 1400 further includes including, in the SCI, the indication that the first interference report is suitable for the first UE to use to determine the transmit parameters, based on the comparison.

Example Wireless Communication Device

Figure 15:
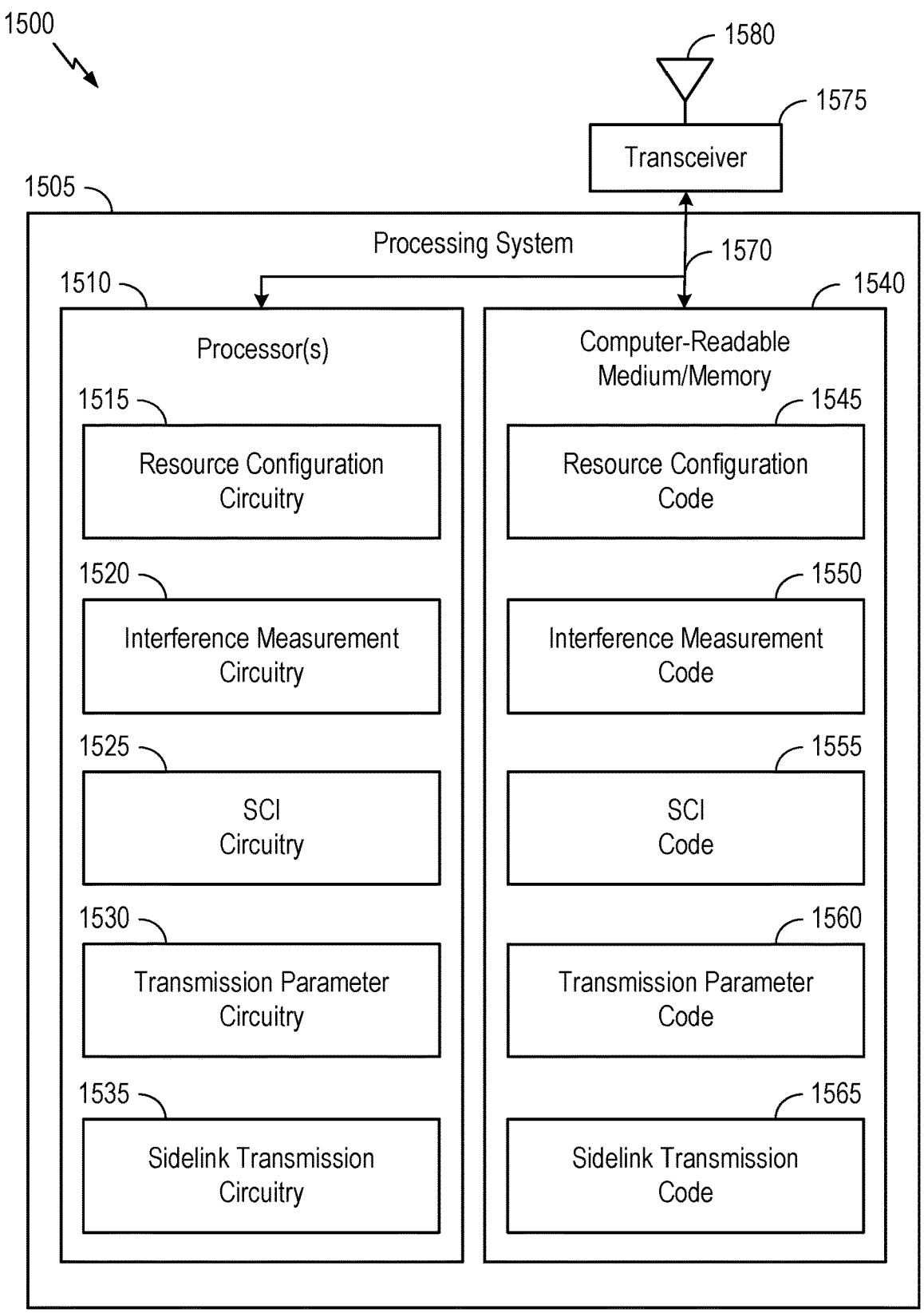
FIGS. 15 and 16 depict example communication devices according to aspects of the present disclosure.

FIG. 15 depicts an example communications device 1500 that includes various components operable, configured, or adapted to perform operations for the techniques disclosed herein, such as the operations depicted and described with respect to FIGS. 9, 12 and 13. In some examples, communication device 1500 may be a UE 104 as described, for example with respect to FIGS. 1 and 2.

Communications device 1500 includes a processing system 1505 coupled to the transceiver 1575 (e.g., a transmitter and/or a receiver). The transceiver 1575 is configured to transmit (or send) and receive signals for the communications device 1500 via the antenna 1580, such as the various signals as described herein. The transceiver 1575 may communicate bi-directionally, via the antennas 1580, wired links, or wireless links as described herein. For example, the transceiver 1575 may represent a wireless transceiver and may communicate bi-directionally with another wireless transceiver. The transceiver 1575 may also include or be connected to a modem to modulate the packets and provide the modulated packets to for transmission, and to demodulate received packets. In some examples, the transceiver 1575 may be tuned to operate at specified frequencies. For example, a modem can configure the transceiver 1575 to operate at a specified frequency and power level based on the communication protocol used by the modem.

Processing system 1505 may be configured to perform processing functions for communications device 1500, including processing signals received and/or to be transmitted by communications device 1500. Processing system 1505 includes one or more processors 1510 coupled to a computer-readable medium/memory 1540 via a bus 1570.

In some examples, one or more processors 1510 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1510 are configured to operate a memory array using a memory controller. In other cases, a memory controller is integrated into the one or more processors 1510. In some cases, the one or more processors 1510 are configured to execute computer-readable instructions stored in a memory to perform various functions. In some aspects, one or more processors 1510 include special purpose components for modem processing, baseband processing, digital signal processing, or transmission processing.

In certain aspects, computer-readable medium/memory 1540 is configured to store instructions (e.g., computer-executable code) that when executed by the one or more processors 1510, cause the one or more processors 1510 to perform the operations illustrated in 9, 12 and 13, or other operations for performing the various techniques discussed herein.

In one aspect, computer-readable medium/memory 1540 includes resource configuration code 1545, interference measurement code 1550, SCI code 1555, transmission parameter code 1560, and sidelink transmission code 1565.

Examples of computer-readable medium/memory 1540 include random access memory (RAM), read-only memory (ROM), solid state memory, a hard drive, a hard disk drive, etc. In some examples, computer-readable medium/memory 1540 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1500 may provide means for performing the methods described herein, including with respect to 9, 12 and 13.

In some examples, means for transmitting or sending (or means for outputting for transmission) may include transceivers 254 and/or antenna(s) 252 of the UE 104 illustrated in FIG. 2 and/or the transceiver 1575 and the antenna 1580 of the communication device in FIG. 15.

In some examples, means for receiving (or means for obtaining) may include transceivers 254 and/or antenna(s) 252 of the UE 104 illustrated in FIG. 2 and/or the transceiver 1575 and the antenna 1580 of the communication device in FIG. 15.

In some examples, means for receiving and transmitting may include various processing system 1505 components, such as: the one or more processors 1510 in FIG. 15, or aspects of the UE 104 depicted in FIG. 2, including receive processor 258, transmit processor 264, TX MIMO processor 266, and/or controller/processor 280 (including sidelink communications component 281).

In one aspect, one or more processors 1510 includes resource configuration circuitry 1515, interference measurement circuitry 1520, SCI circuitry 1525, transmission parameter circuitry 1530, and sidelink transmission circuitry 1535.

According to some aspects, resource configuration circuitry 1515 receives signaling indicating resources, within a sidelink resource pool, that are configured for sidelink interference measurement. In some aspects, the signaling indicates a puncturing pattern for puncturing resources of at least one of PSSCH resources, a DMRS, or SL-RS. In some aspects, the puncturing pattern is indicated in a sidelink RRC signaled configuration or MAC CE signaled configuration, and wherein the puncturing pattern applies to multiple sidelink resource pools. In some aspects, the different puncturing patterns are defined for different sidelink resource pools. In some aspects, the puncturing pattern includes a puncturing pattern selected from a set of configured puncturing patterns. In some aspects, the puncturing pattern is selected based on a suggestion by the first UE. In some aspects, the puncturing pattern indicates resources to be punctured within one or more DMRS REs within a RB or one or more sets of DMRS REs within an RB. In some aspects, the puncturing pattern indicates PSSCH resources to be punctured based on at least one of a comb level or comb offset.

In some examples, resource configuration circuitry 1515 determines whether the puncturing pattern is applied to a scheduled PSSCH. In some aspects, the determination is based on at least one of a RNTI value, SCI content, an SCI format, or a rule. In some examples, resource configuration circuitry 1515 determines whether the puncturing pattern is applied to DMRS only, PSSCH only, or both DMRS and PSSCH. In some aspects, the puncturing pattern indicates a pattern of SL-RS resources to puncture associated with a comb of REs within a RB or particular REs within the RB. In some aspects, the puncturing pattern further indicates RBs in which the puncturing pattern is to be applied. In some aspects, the resources indicated by the signaling include SL-CSI-IM resources. In some aspects, the signaling indicates one or more SL-CSI-IM resources configured per sidelink resource pool. In some aspects, a same set of SL-CSI-IM resources is configured across multiple sidelink resource pools. In some aspects, at least one sidelink resource pool is configured with multiple SL-CSI-IM patterns. In some aspects, the first UE receives an indication of one or more of the multiple SL-CSI-IM patterns via SCI. In some examples, resource configuration circuitry 1515 receives signaling from a network entity indicating whether the first UE is to use SL-RS, SL-CSI-IM, or both SL-RS and SL-CSI-IM for the interference measurements on which the first interference report is based. In some aspects, the resources indicated by the signaling include SL-ZP-CSI-RS.

According to some aspects, interference measurement circuitry 1520 transmits, to at least a second UE, a first interference report that is based on interference measurements taken on the indicated resources. In some aspects, the first interference report indicates at least one of an interference-plus-noise covariance matrix, an interference power, an interference rank, or interference eigenvalues. In some aspects, the first interference report is transmitted in a second stage of two-stage SCI. In some aspects, the first UE is a primary UE and the first UE transmits the first interference report to a third UE. In some aspects, the first interference report is transmitted in at least one of a PSFCH, MAC CE, or a physical sidelink shared channel.

In some examples, interference measurement circuitry 1520 receives a second interference report from the second UE. In some examples, interference measurement circuitry 1520 determines, based on the first interference report and the second interference report, whether interference determined at the first UE and interference determined at the second UE has same or similar characteristics. In some examples, interference measurement circuitry 1520 receives, prior to transmitting the first interference report, signaling indicating whether the first UE is to transmit the first interference report.

According to some aspects, SCI circuitry 1525 receives, from the second UE, SCI including information generated by the second UE based on the first interference report. In some aspects, the information included in the SCI includes at least one of a second interference report generated by the second UE or an indication that the first interference report is suitable for the first UE to use to determine the transmit parameters. In some examples, SCI circuitry 1525 transmits, to the second UE, SCI that includes an indication of whether the second UE is to transmit, to the first UE, a second interference report generated by the second UE.

According to some aspects, transmission parameter circuitry 1530 determines, using at least one of the information or SL-RS received with the SCI, transmit parameters.

According to some aspects, sidelink transmission circuitry 1535 transmits a sidelink transmission to the second UE using the determined transmit parameters.

Notably, FIG. 15 is just one example, and many other examples and configurations of communication device are possible.

Figure 16:
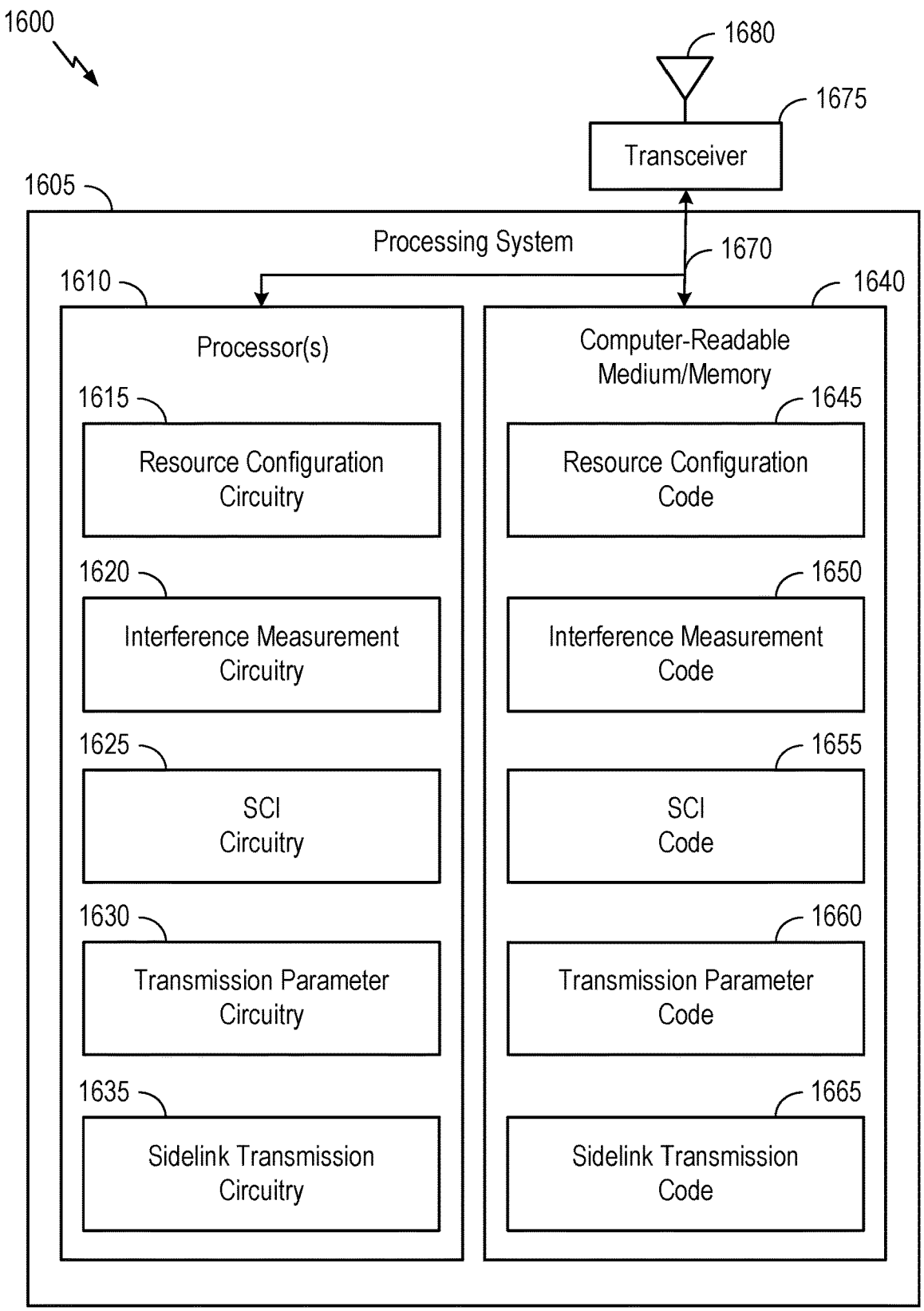

FIG. 16 depicts an example communications device 1600 that includes various components operable, configured, or adapted to perform operations for the techniques disclosed herein, such as the operations depicted and described with respect to FIGS. 9, 12 and 14. In some examples, communication device may be a UE 104 as described, for example with respect to FIGS. 1 and 2.

Communications device 1600 includes a processing system 1605 coupled to the transceiver 1655 (e.g., a transmitter and/or a receiver). The transceiver 1655 is configured to transmit (or send) and receive signals for the communications device 1600 via the antenna 1660, such as the various signals as described herein. The transceiver 1655 may communicate bi-directionally, via the antennas 1660, wired links, or wireless links as described herein. For example, the transceiver 1655 may represent a wireless transceiver and may communicate bi-directionally with another wireless transceiver. The transceiver 1655 may also include or be connected to a modem to modulate the packets and provide the modulated packets to for transmission, and to demodulate received packets. In some examples, the transceiver 1655 may be tuned to operate at specified frequencies. For example, a modem can configure the transceiver 1655 to operate at a specified frequency and power level based on the communication protocol used by the modem.

Processing system 1605 may be configured to perform processing functions for communications device 1600, including processing signals received and/or to be transmitted by communications device 1600. Processing system 1605 includes one or more processors 1610 coupled to a computer-readable medium/memory 1630 via a bus 1650.

In some examples, one or more processors 1610 may include one or more intelligent hardware devices, (e.g., a general-purpose processing component, a DSP, a CPU, a GPU, a microcontroller, an ASIC, a FPGA, a programmable logic device, a discrete gate or transistor logic component, a discrete hardware component, or any combination thereof). In some cases, the one or more processors 1610 are configured to operate a memory array using a memory controller. In other cases, a memory controller is integrated into the one or more processors 1610. In some cases, the one or more processors 1610 are configured to execute computer-readable instructions stored in a memory to perform various functions. In some aspects, one or more processors 1610 include special purpose components for modem processing, baseband processing, digital signal processing, or transmission processing.

In certain aspects, computer-readable medium/memory 1630 is configured to store instructions (e.g., computer-executable code) that when executed by the one or more processors 1610, cause the one or more processors 1610 to perform the operations illustrated in FIGS. 9, 12 and 14, or other operations for performing the various techniques discussed herein.

In one aspect, computer-readable medium/memory 1630 includes interference report code 1635, channel estimation code 1640, and SCI transmission code 1645.

Examples of a computer-readable medium/memory 1630 include RAM, ROM, solid state memory, a hard drive, a hard disk drive, etc. In some examples, computer-readable medium/memory 1630 is used to store computer-readable, computer-executable software including instructions that, when executed, cause a processor to perform various functions described herein. In some cases, the memory contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1600 may provide means for performing the methods described herein, including with respect to 9, 12 and 14.

In some examples, means for transmitting or sending (or means for outputting for transmission) may include transceivers 254 and/or antenna(s) 252 of the UE 104 illustrated in FIG. 2 and/or the transceiver 1655 and the antenna 1660 of the communication device in FIG. 16.

In some examples, means for receiving (or means for obtaining) may include transceivers 254 and/or antenna(s) 252 of the UE 104 illustrated in FIG. 2 and/or the transceiver 1655 and the antenna 1660 of the communication device in FIG. 16.

In some examples, means for receiving and using may include various processing system 1605 components, such as: the one or more processors 1610 in FIG. 16, or aspects of the UE 104 depicted in FIG. 2, including receive processor 258, transmit processor 264, TX MIMO processor 266, and/or controller/processor 280 (including sidelink communications component 281).

In one aspect, one or more processors 1610 includes interference report circuitry 1615, channel estimation circuitry 1620, and SCI transmission circuitry 1625.

According to some aspects, interference report circuitry 1615 receives, from a first UE, a first interference report that is based on interference measurements taken by the first UE on resources, within a sidelink resource pool, that are configured for sidelink interference measurement. In some aspects, the first interference report indicates at least one of an interference-plus-noise covariance matrix, an interference power, an interference rank, or interference eigenvalues. In some aspects, the first interference report is received in a second stage of two-stage SCI. In some examples, interference report circuitry 1615 receives, from the first UE, an indication for the second UE to transmit the second interference report. In some examples, interference report circuitry 1615 includes the second interference report in the SCI based on the indication.

According to some aspects, channel estimation circuitry 1620 uses information in the first interference report to perform channel estimation for a sidelink channel between the first UE and the second UE.

According to some aspects, SCI transmission circuitry 1625 transmits, to the first UE, SCI including at least one of information generated by the second UE based on the first interference report or a second interference report generated by the second UE. In some aspects, the information included in the SCI includes at least one of the second interference report generated by the second UE or an indication that the first interference report is suitable for the first UE to use to determine transmit parameters.

In some examples, interference report circuitry 1615 determines the first interference report is suitable for the first UE to use to determine transmit parameters by comparing interference parameters included in the first interference report to interference parameters generated at the second UE. In some examples, SCI transmission circuitry 1625 includes, in the SCI, the indication that the first interference report is suitable for the first UE to use to determine the transmit parameters, based on the comparison.

Notably, FIG. 16 is just one example, and many other examples and configurations of communication device are possible.

Example Clauses

Implementation examples are described in the following numbered clauses:

Clause 1: A method of wireless communication by a first user equipment, the method comprising: receiving signaling indicating resources, within a sidelink resource pool, that are configured for sidelink interference measurement; and transmitting, to a second UE, a first interference report including interference measurement information corresponding to the indicated resources.

Clause 2: The method of Clause 1, wherein the interference measurement information indicates at least one of: an interference-plus-noise covariance matrix; an interference power; an interference rank; or interference eigenvalues.

Clause 3: The method of any one of Clauses 1 and 2, wherein the first interference report is transmitted in a second stage of two-stage SCI.

Clause 4: The method of any one of Clauses 1-3, further comprising: receiving, from the second UE, sidelink control information (SCI) including information based on the first interference report, determining, based on at least one of the information based on the first interference report or sidelink reference signals (SL-RS) associated with the SCI, transmit parameters; and transmitting a sidelink transmission to the second UE using the determined transmit parameters.

Clause 5: The method of Clause 4, wherein the information based on the first interference report comprises at least one of: a second interference report; or an indication that the first interference report is suitable for the first UE to use to determine the transmit parameters.

Clause 6: The method of any one of Clauses 1-5, wherein the first UE is a primary UE; and the processor is configured to transmit the first interference report to a third UE.

Clause 7: The method of any one of Clauses 1-6, wherein the signaling indicates a puncturing pattern for puncturing resources of at least one of a physical sidelink shared channel (PSSCH), a demodulation reference signal (DMRS), or sidelink reference signals (SL-RS).

Clause 8: The method of Clause 7, wherein the puncturing pattern is indicated in a sidelink radio resource control (RRC) signaled configuration or medium access control (MAC) control element (CE) signaled configuration, and wherein the puncturing pattern applies to multiple sidelink resource pools.

Clause 9: The method of Clause 7, wherein a plurality of puncturing patterns are defined for different sidelink resource pools, wherein the plurality of puncturing patterns includes the puncturing pattern.

Clause 10: The method of Clause 7, wherein the puncturing pattern is a particular puncturing pattern of a plurality of configured puncturing patterns.

Clause 11: The method of Clause 10, wherein transmitting signaling to the second UE indicating one of the plurality of configured puncturing patterns; and receiving signaling from the second UE confirming selection of the indicated one of the plurality of configured puncturing patterns for puncturing resources of the at least one of the PSSCH, the DMRS, or SL-RS.

Clause 12: The method of Clause 7, wherein the puncturing pattern indicates resources to be punctured within: one or more DMRS resource elements (REs) within a resource block (RB); or one or more sets of DMRS REs within an RB.

Clause 13: The method of Clause 7, wherein the puncturing pattern indicates PSSCH resources to be punctured based on at least one of a comb level or a comb offset.

Clause 14: The method of Clause 7, further comprising: determining whether the puncturing pattern is applied to a scheduled PSSCH determining whether the puncturing pattern is applied to a scheduled PSSCH.

Clause 15: The method of Clause 14, wherein the determination is based on at least one of a RNTI value, SCI content, an SCI format, or a rule.

Clause 16: The method of Clause 14, further comprising: determining whether the puncturing pattern is applied to the scheduled PSSCH based on at least one of a radio network temporary identifier (RNTI) value, sidelink control information (SCI) content, an SCI format, or a rule.

Clause 17: The method of Clause 7, wherein the puncturing pattern indicates a pattern of SL-RS resources to puncture: associated with a comb of resource elements (REs) within a resource block (RB); or particular REs within the RB.

Clause 18: The method of Clause 17, wherein the puncturing pattern further indicates RBs in which the puncturing pattern is to be applied.

Clause 19: The method of any one of Clauses 1-18, wherein the resources indicated by the signaling comprise sidelink channel state information interference measurement (SL-CSI-IM) resources; and the signaling indicates one or more SL-CSI-IM resources configured per sidelink resource pool.

Clause 20: The method of Clause 19, wherein a same set of SL-CSI-IM resources is configured across multiple sidelink resource pools.

Clause 21: The method of Clause 19, wherein at least one sidelink resource pool is configured with multiple SL-CSI-TM patterns and the first UE receives an indication of one or more of the multiple SL-CSI-IM patterns via SCI.

Clause 22: The method of Clause 19, further comprising: receiving signaling from a network entity indicating whether the first UE is to use SL-RS, SL-CSI-IM, or both SL-RS and SL-CSI-IM for the interference measurements on which the first interference report is based.

Clause 23: The method of any one of Clauses 1-22, wherein the first interference report is transmitted in at least one of a PSFCH, MAC CE, or a physical sidelink shared channel.

Clause 24: The method of any one of Clauses 1-23, further comprising: receiving a second interference report from the second UE; and determining, based on the first interference report and the second interference report, whether interference determined at the first UE and interference determined at the second UE have similar or different characteristics.

Clause 25: The method of any one of Clauses 1-24, wherein the resources indicated by the signaling comprise sidelink zero power channel state information reference signals (SL-ZP-CSI-RS).

Clause 26: The method of any one of Clauses 1-25, further comprising: receiving, prior to transmission of the first interference report, signaling indicating whether the first UE is to transmit the first interference report.

Clause 27: The method of any one of Clauses 1-26, further comprising: transmitting, to the second UE, sidelink control information (SCI) that includes an indication of whether the second UE is to transmit, to the first UE, a second interference report generated by the second UE.

Clause 28: A method of wireless communication by a first user equipment, the method comprising: receiving, from a second UE, a first interference report including interference measurement information corresponding to resources within a sidelink resource pool that are configured for sidelink interference measurement; and performing, based on the interference measurement information, channel estimation for a sidelink channel between the first UE and the second UE.

Clause 29: The method of Clause 28, wherein the interference measurement information indicates at least one of: an interference-plus-noise covariance matrix; an interference power; an interference rank; or interference eigenvalues.

Clause 30: The method of any one of Clauses 28-29, wherein the first interference report is received in a second stage of two-stage SCI.

Clause 31: The method of any one of Clauses 28-30, further comprising: transmitting, to the second UE, sidelink control information (SCI) including at least one of information generated by the first UE based on the first interference report or a second interference report generated by the second UE.

Clause 32: The method of Clause 31, wherein the information included in the SCI comprises at least one of the second interference report generated by the second UE or an indication that the first interference report is suitable for the first UE to use to determine transmit parameters.

Clause 33: The method of Clause 32, further comprising: receiving, from the first UE, an indication for the second UE to transmit the second interference report; and including the second interference report in the SCI based on the indication.

Clause 34: The method of Clause 32, further comprising: determining the first interference report is suitable for the first UE to use to determine transmit parameters by comparing interference parameters included in the first interference report to interference parameters generated at the second UE; and including, in the SCI, the indication that the first interference report is suitable for the first UE to use to determine the transmit parameters, based on the comparison.

Clause 35: A processing system, comprising: a memory comprising computer-executable instructions; one or more processors configured to execute the computer-executable instructions and cause the processing system to perform a method in accordance with any one of Clauses 1-34.

Clause 36: A processing system, comprising means for performing a method in accordance with any one of Clauses 1-34.

Clause 37: A non-transitory computer-readable medium comprising computer-executable instructions that, when executed by one or more processors of a processing system, cause the processing system to perform a method in accordance with any one of Clauses 1-34.

Clause 38: A computer program product embodied on a computer-readable storage medium comprising code for performing a method in accordance with any one of Clauses 1-34.

A first user equipment (UE) for wireless communication, comprising a processor; and memory coupled with the processor, wherein the processor is configured to perform a method in accordance with any one of Clauses 1-34.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to YIMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a PSSCH, and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a PSSCH.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH DMRS, and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a RB, may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a RB (also referred to as physical RBs (PRBs)) that extends 12 consecutive subcarriers. The resource grid is divided into multiple REs. The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DMRS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of interference measurement and reporting in sidelink communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first user equipment (UE) for wireless communication, comprising:
   a processor; and
   memory coupled with the processor, wherein the processor is configured to:
   receive signaling indicating resources, within a sidelink resource pool, that are configured for sidelink interference measurement;
   transmit, to a second UE, a first interference report including interference measurement information corresponding to the indicated resources,
   receive, from the second UE, sidelink control information (SCI) including information based on the first interference report;
   determine based on at least one of the information based on the first interference report or sidelink reference signals (SL-RS) associated with the SCI, transmit parameters; and
   transmit a sidelink transmission to the second UE using the determined transmit parameters.

2. The first UE of claim 1, wherein the interference measurement information indicates at least one of:
   an interference-plus-noise covariance matrix;
   an interference power;
   an interference rank; or
   interference eigenvalues.

3. The first UE of claim 1, wherein, to transmit the first interference report, the processor is configured to transmit the first interference report in a second stage of two-stage sidelink control information (SCI).

4. The first UE of claim 1, wherein the information based on the first interference report comprises at least one of:
   a second interference report; or
   an indication that the first interference report is suitable for the first UE to use to determine the transmit parameters.

5. The first UE of claim 1, wherein:
   the first UE is a primary UE; and
   the processor is configured to transmit the first interference report to a third UE.

6. The first UE of claim 1, wherein the signaling indicates a puncturing pattern for puncturing resources of at least one of a physical sidelink shared channel (PSSCH), a demodulation reference signal (DMRS), or sidelink reference signals (SL-RS).

7. The first UE of claim 6, wherein a plurality of puncturing patterns are defined for different sidelink resource pools, wherein the plurality of puncturing patterns includes the puncturing pattern.

8. The first UE of claim 1, wherein:
   the resources indicated by the signaling comprise sidelink channel state information interference measurement (SL-CSI-IM) resources; and
   the signaling indicates one or more SL-CSI-IM resources configured per sidelink resource pool.

9. The first UE of claim 1, wherein, to transmit the first interference report, the processor is configured to transmit the first interference report in at least one of a physical sidelink feedback channel (PSFCH), a medium access control (MAC) control element (CE), or a physical sidelink shared channel (PSSCH).

10. The first UE of claim 1, wherein the resources indicated by the signaling comprise sidelink zero power channel state information reference signals (SL-ZP-CSI-RS).

11. The first UE of claim 1, wherein the processor is configured to:
    receive, prior to transmission of the first interference report, signaling indicating whether the first UE is to transmit the first interference report.

12. The first UE of claim 1, wherein the processor is configured to:
generate the interference measurement information.

13. The first UE of claim 12, wherein, to generate the interference measurement information, the processor is configured to:
perform one or more measurements on the indicated resources, wherein the interference information is based on the one or more measurements.

14. The first UE of claim 1, wherein the information based on the first interference report comprises a second interference report.

15. The first UE of claim 1, wherein the information based on the first interference report comprises an indication that the first interference report is suitable for the first UE to use to determine the transmit parameters.

16. A first user equipment (UE) for wireless communication, comprising:
a processor; and
memory coupled with the processor, wherein the processor is configured to:
receive signaling indicating resources, within a sidelink resource pool, that are configured for sidelink interference measurement, wherein the signaling indicates a puncturing pattern for puncturing resources of at least one of a physical sidelink shared channel (PSSCH), a demodulation reference signal (DMRS), or sidelink reference signals (SL-RS), wherein the puncturing pattern is indicated in a sidelink radio resource control (RRC) signaled configuration or medium access control (MAC) control element (CE) signaled configuration, and wherein the puncturing pattern applies to multiple sidelink resource pools; and
transmit, to a second UE, a first interference report including interference measurement information corresponding to the indicated resources.

17. The first UE of claim 16, wherein a plurality of puncturing patterns are defined for different sidelink resource pools, wherein the plurality of puncturing patterns includes the puncturing pattern.

18. The first UE of claim 16, wherein the puncturing pattern is a particular puncturing pattern of a plurality of configured puncturing patterns.

19. The first UE of claim 16, wherein the processor is configured to:
generate the interference measurement information, wherein, to generate the interference measurement information, the processor is configured to: perform one or more measurements on the indicated resources, wherein the interference information is based on the one or more measurements.

20. A first user equipment (UE) for wireless communication, comprising:
a processor; and
memory coupled with the processor, wherein the processor is configured to:
receive signaling indicating resources, within a sidelink resource pool, that are configured for sidelink interference measurement, wherein the signaling indicates a puncturing pattern for puncturing resources of at least one of a physical sidelink shared channel (PSSCH), a demodulation reference signal (DMRS), or sidelink reference signals (SL-RS), wherein the puncturing pattern is a particular puncturing pattern of a plurality of configured puncturing patterns,
transmit, to a second UE, a first interference report including interference measurement information corresponding to the indicated resources;
transmit signaling to the second UE indicating one of the plurality of configured puncturing patterns; and
receive signaling from the second UE confirming selection of the indicated one of the plurality of configured puncturing patterns for puncturing resources of the at least one of the PSSCH, the DMRS, or SL-RS.

21. The first UE of claim 20, wherein the processor is configured to:
generate the interference measurement information, wherein, to generate the interference measurement information, the processor is configured to: perform one or more measurements on the indicated resources, wherein the interference information is based on the one or more measurements.

22. A first user equipment (UE) for wireless communication, comprising:
a processor; and
memory coupled with the processor, wherein the processor is configured to:
receive signaling indicating resources, within a sidelink resource pool, that are configured for sidelink interference measurement, wherein the signaling indicates a puncturing pattern for puncturing resources of a demodulation reference signal (DMRS), wherein the puncturing pattern indicates resources to be punctured within one or more DMRS resource elements (REs) within a resource block (RB), or one or more sets of DMRS REs within an RB; and
transmit, to a second UE, a first interference report including interference measurement information corresponding to the indicated resources.

23. The first UE of claim 22, wherein the processor is configured to:
generate the interference measurement information, wherein, to generate the interference measurement information, the processor is configured to: perform one or more measurements on the indicated resources, wherein the interference information is based on the one or more measurements.

24. A first user equipment (UE) for wireless communication, comprising:
a processor; and
memory coupled with the processor, wherein the processor is configured to:
receive signaling indicating resources, within a sidelink resource pool, that are configured for sidelink interference measurement, wherein the signaling indicates a physical sidelink shared channel (PSSCH), wherein the puncturing pattern indicates PSSCH resources to be punctured based on at least one of a comb level or a comb offset and
transmit, to a second UE, a first interference report including interference measurement information corresponding to the indicated resources.

25. The first UE of claim 24, wherein the processor is configured to:
generate the interference measurement information, wherein, to generate the interference measurement information, the processor is configured to: perform one or more measurements on the indicated resources, wherein the interference information is based on the one or more measurements.

26. A first user equipment (UE) for wireless communication, comprising:

a processor; and memory coupled with the processor, wherein the processor is configured to:

receive signaling indicating resources, within a sidelink resource pool, that are configured for sidelink interference measurement, wherein the signaling indicates a puncturing pattern for puncturing resources of at least one of a physical sidelink shared channel (PSSCH), a demodulation reference signal (DMRS), or sidelink reference signals (SL-RS);

determine whether the puncturing pattern is applied to a scheduled PSSCH; and transmit, to a second UE, a first interference report including interference measurement information corresponding to the indicated resources.

27. The first UE of claim 26, wherein, to determine whether the puncturing pattern is applied to the scheduled PSSCH, the processor is configured to determine whether the puncturing pattern is applied to the scheduled PSSCH based on at least one of a radio network temporary identifier (RNTI) value, sidelink control information (SCI) content, an SCI format, or a rule.

28. The first UE of claim 26, wherein the processor is configured to:

determine whether the puncturing pattern is applied to DMRS only, PSSCH only, or both DMRS and PSSCH.

29. The first UE of claim 26, wherein the processor is configured to:

generate the interference measurement information, wherein, to generate the interference measurement information, the processor is configured to: perform one or more measurements on the indicated resources, wherein the interference information is based on the one or more measurements.

30. A first user equipment (UE) for wireless communication, comprising:

a processor; and memory coupled with the processor, wherein the processor is configured to:

receive signaling indicating resources, within a sidelink resource pool, that are configured for sidelink interference measurement, wherein the signaling indicates a puncturing pattern for puncturing resources of at least one of a physical sidelink shared channel (PSSCH), a demodulation reference signal (DMRS), or sidelink reference signals (SL-RS), wherein the puncturing pattern indicates a pattern of SL-RS resources to puncture: associated with a comb of resource elements (REs) within a resource block (RB) or particular REs within the RB; and transmit, to a second UE, a first interference report including interference measurement information corresponding to the indicated resources.

31. The first UE of claim 30, wherein the puncturing pattern further indicates RBs in which the puncturing pattern is to be applied.

32. The first UE of claim 30, wherein the processor is configured to:

generate the interference measurement information, wherein, to generate the interference measurement information, the processor is configured to: perform one or more measurements on the indicated resources, wherein the interference information is based on the one or more measurements.

33. A first user equipment (UE) for wireless communication, comprising:

a processor; and memory coupled with the processor, wherein the processor is configured to:

receive signaling indicating resources, within a sidelink resource pool, that are configured for sidelink interference measurement;

transmit, to a second UE, a first interference report including interference measurement information corresponding to the indicated resources;

receive a second interference report from the second UE; and determine, based on the first interference report and the second interference report, whether interference determined at the first UE and interference determined at the second UE have similar or different characteristics.

34. The first UE of claim 33, wherein the processor is configured to:

generate the interference measurement information, wherein, to generate the interference measurement information, the processor is configured to: perform one or more measurements on the indicated resources, wherein the interference information is based on the one or more measurements.

35. A first user equipment (UE) for wireless communication, comprising:

a processor; and memory coupled with the processor, wherein the processor is configured to:

receive signaling indicating resources, within a sidelink resource pool, that are configured for sidelink interference measurement;

transmit, to a second UE, a first interference report including interference measurement information corresponding to the indicated resources; and transmit, to the second UE, sidelink control information (SCI) that includes an indication of whether the second UE is to transmit, to the first UE, a second interference report generated by the second UE.

36. The first UE of claim 35, wherein the processor is configured to:

generate the interference measurement information, wherein, to generate the interference measurement information, the processor is configured to: perform one or more measurements on the indicated resources, wherein the interference information is based on the one or more measurements.

* * * * *